United States Patent [19]
Yamanaka et al.

[11] Patent Number: 5,128,931
[45] Date of Patent: Jul. 7, 1992

[54] DATA EXCHANGE APPARATUS

[75] Inventors: Hideaki Yamanaka; Haruo Kitamura, both of Kanagawa, Japan

[73] Assignee: Mitsubishi Denki Kabushiki Kaisha, Tokyo, Japan

[21] Appl. No.: 513,562

[22] Filed: Apr. 24, 1990

[30] Foreign Application Priority Data

Dec. 11, 1989 [JP] Japan .................. 1-321094

[51] Int. Cl.⁵ .......................... H04L 12/56
[52] U.S. Cl. ....................... 370/60; 370/61
[58] Field of Search ............... 370/60, 61, 94

[56] References Cited

U.S. PATENT DOCUMENTS 4,730,305 3/1988 Acampora et al. .......... 370/61

FOREIGN PATENT DOCUMENTS 279443 8/1988 European Pat. Off. .
292962 11/1988 European Pat. Off. .
299473 1/1989 European Pat. Off. .
336373 10/1989 European Pat. Off. .
WO8602510 4/1986 PCT Int'l Appl. .

OTHER PUBLICATIONS

Joseph Y. Hui et al, "A Broadband Packet Switch for Integrated Transport", IEEE J. Selected Areas Commun., SAC-5, 8, pp. 1264-1273 (Oct. 1987).
Jean-Pierre Coudreuse et al, "Prelude-An Asynchronous Time-Division Switched Network", icc, 1987, 22.2, pp. 769-773 (Jun. 1987).
Y. S. Yeh et al, "The Knockout Switch: A Simple modular architecture for high performance packet switching", Proc. ISS '87, pp. 801-808 (Mar. 1987).

Primary Examiner—Douglas W. Olms
Assistant Examiner—Melvin Marcelo
Attorney, Agent, or Firm—Wolf, Greenfield & Sacks

[57] ABSTRACT

A data exchange apparatus having common buffer memories for temporarily storing input data, a vacant buffer selector for selecting a vacant buffer to which the input data is stored and storage memories for storing buffer memory identification information on the bases of the destination of information of data in a predetermined order. The buffer memories are capable of reading and writing data in the order of arrival and are accessible independently of each other, i.e., without affecting each other.

31 Claims, 19 Drawing Sheets

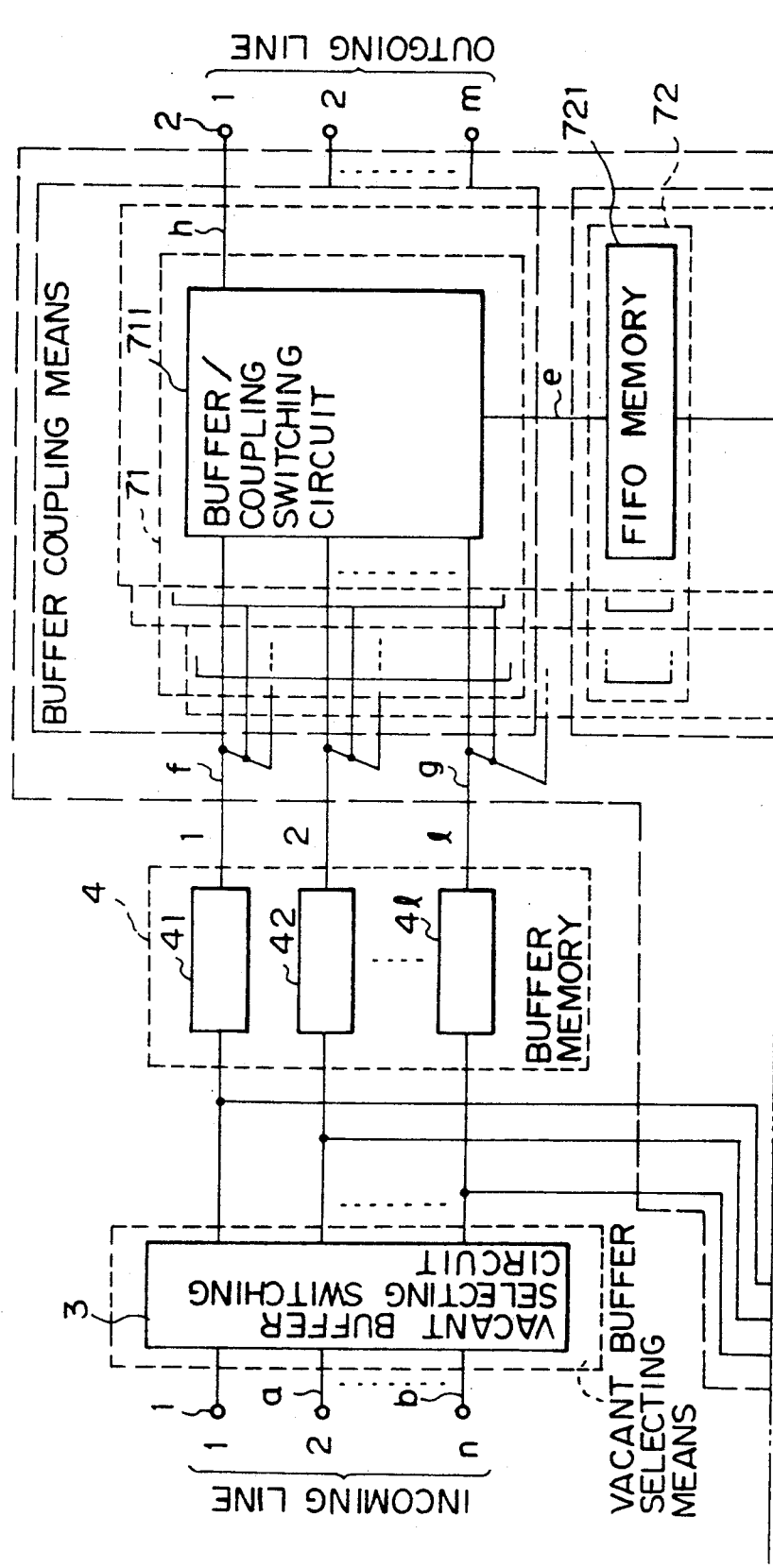

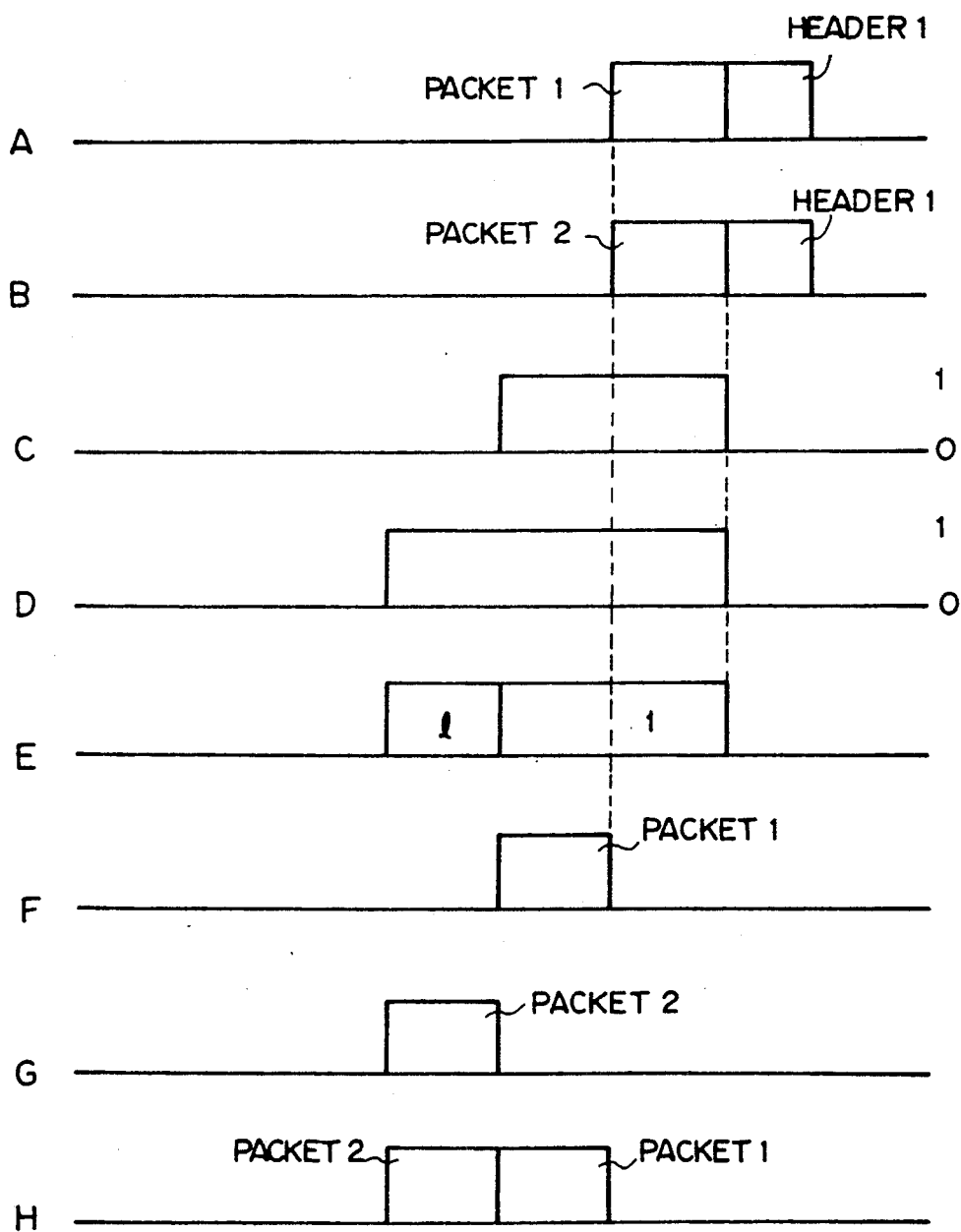

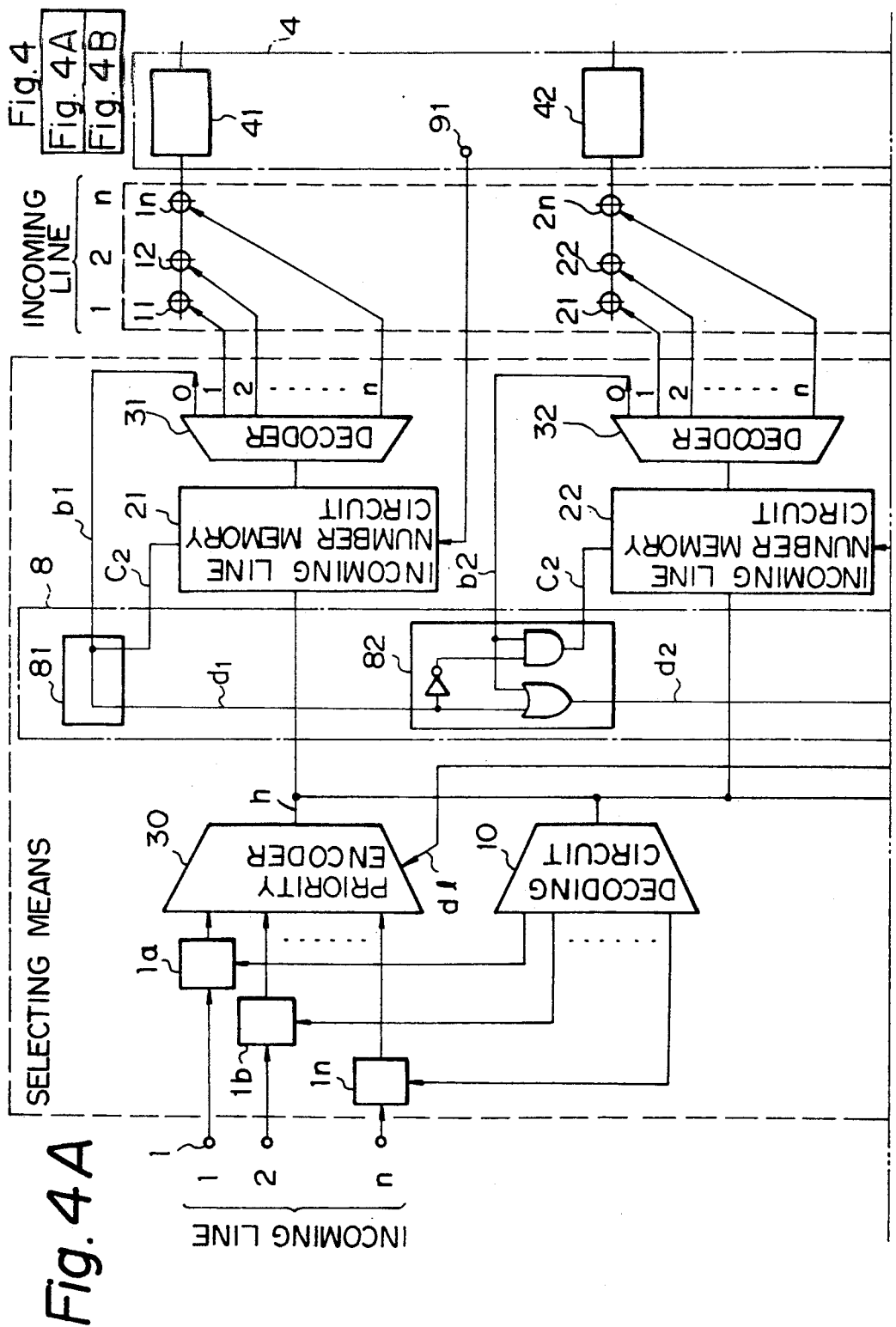

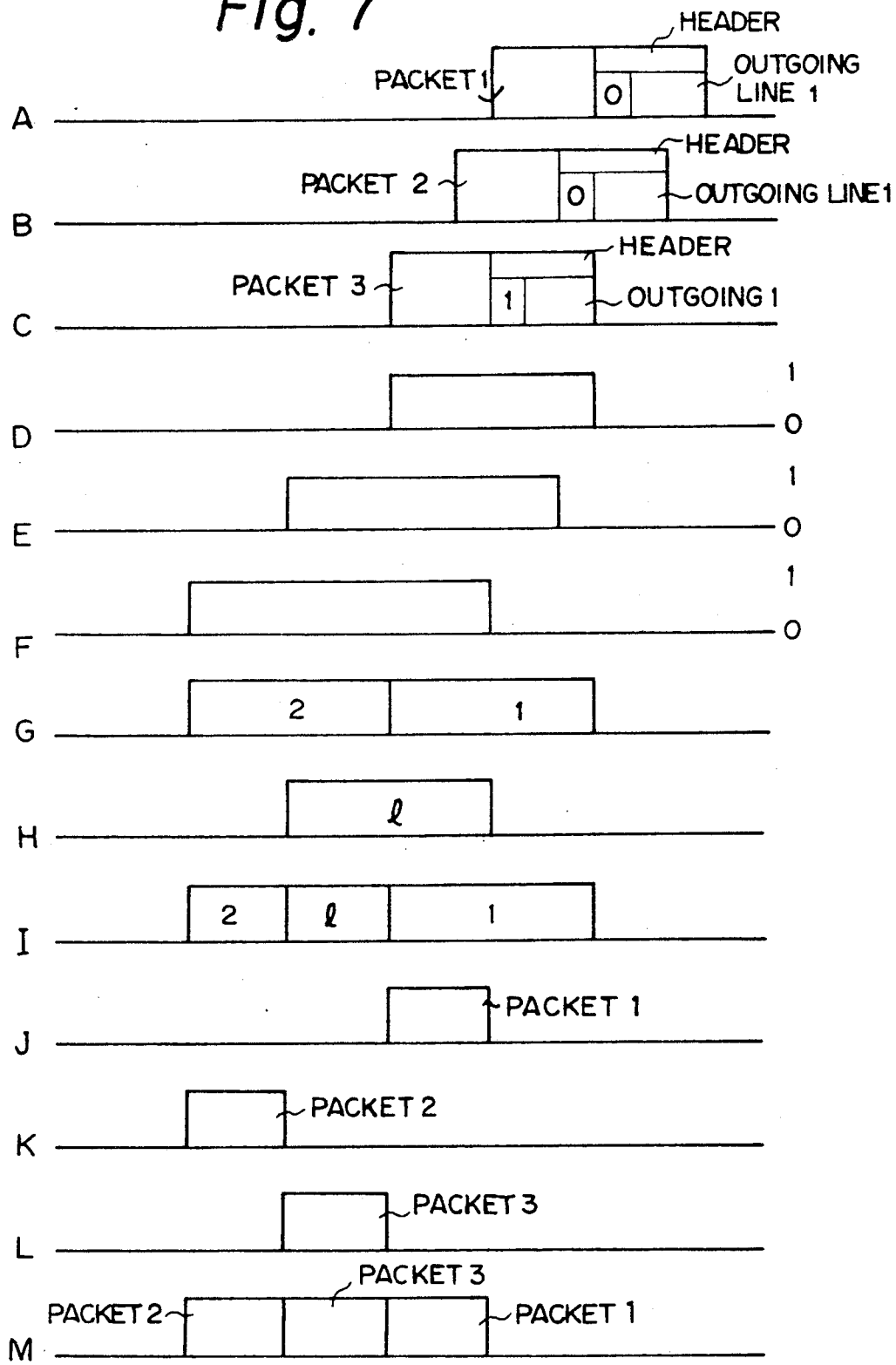

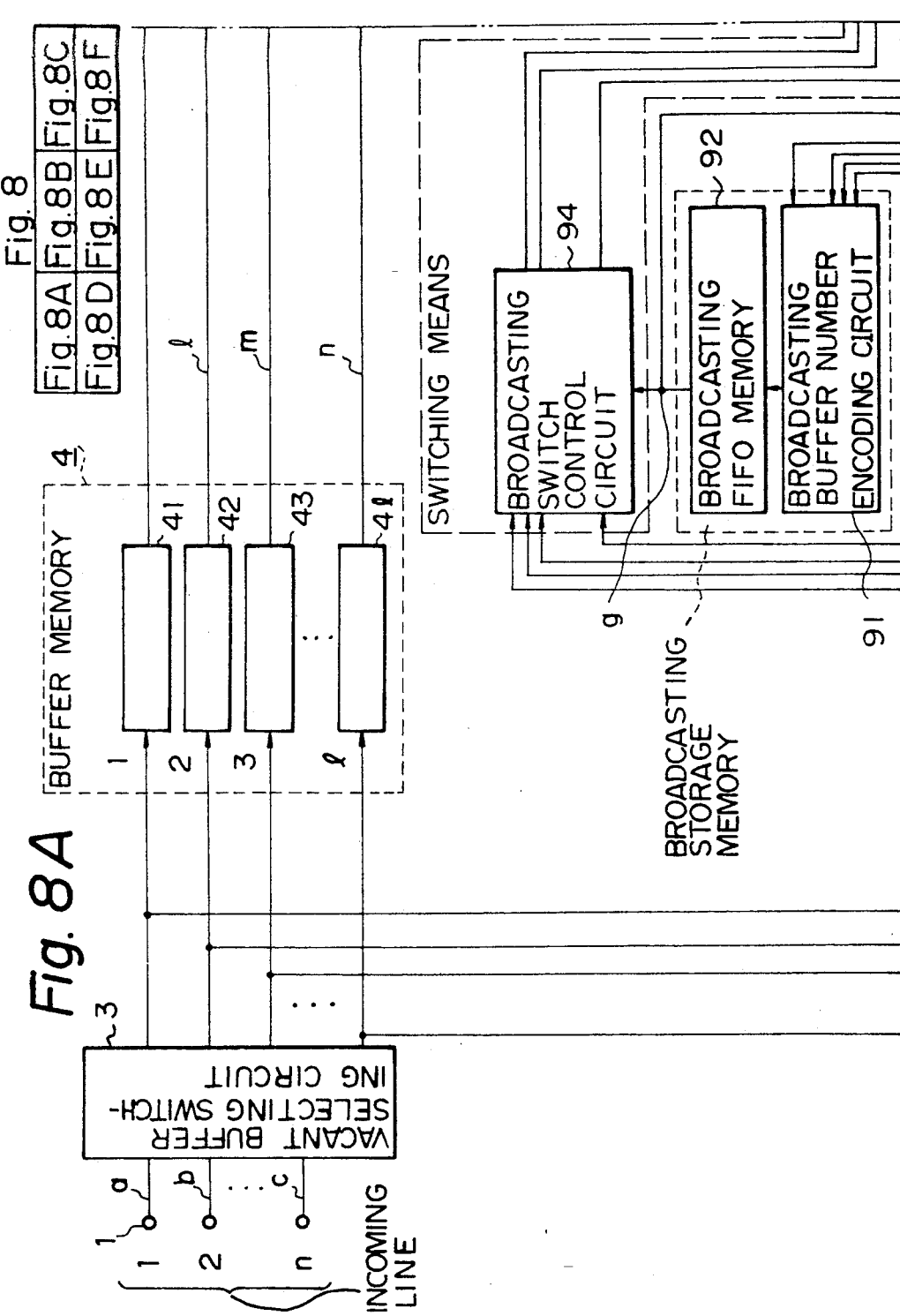

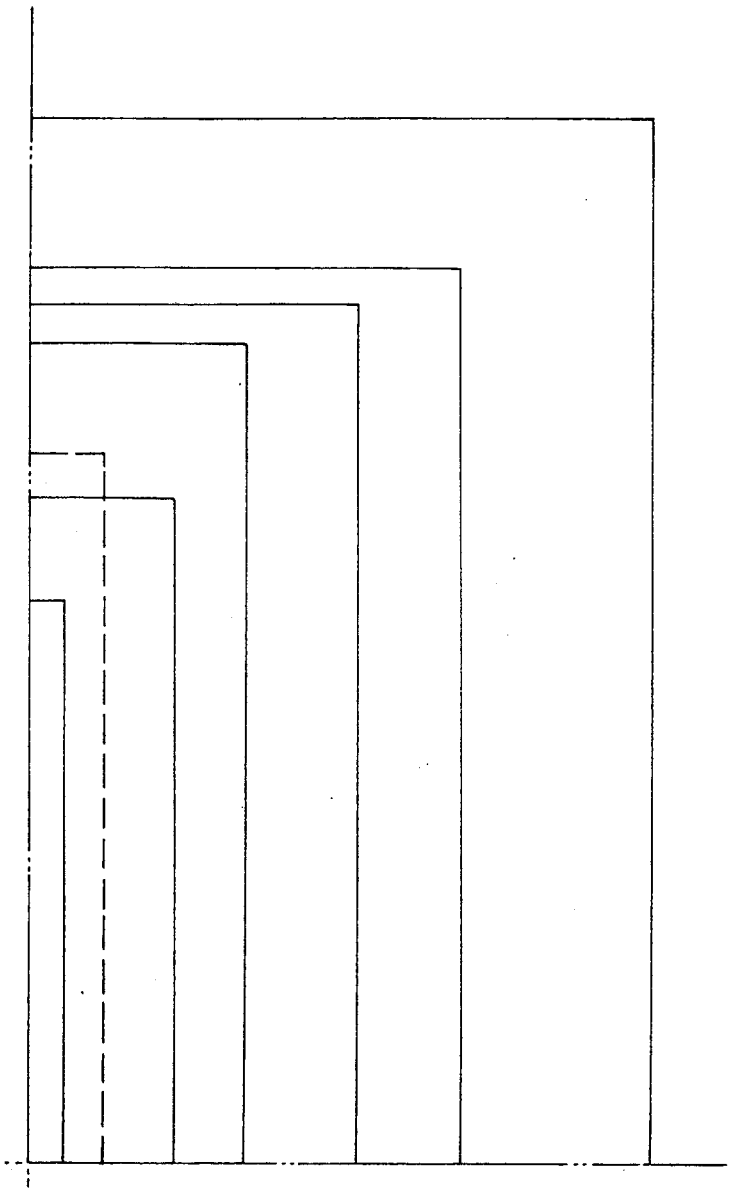

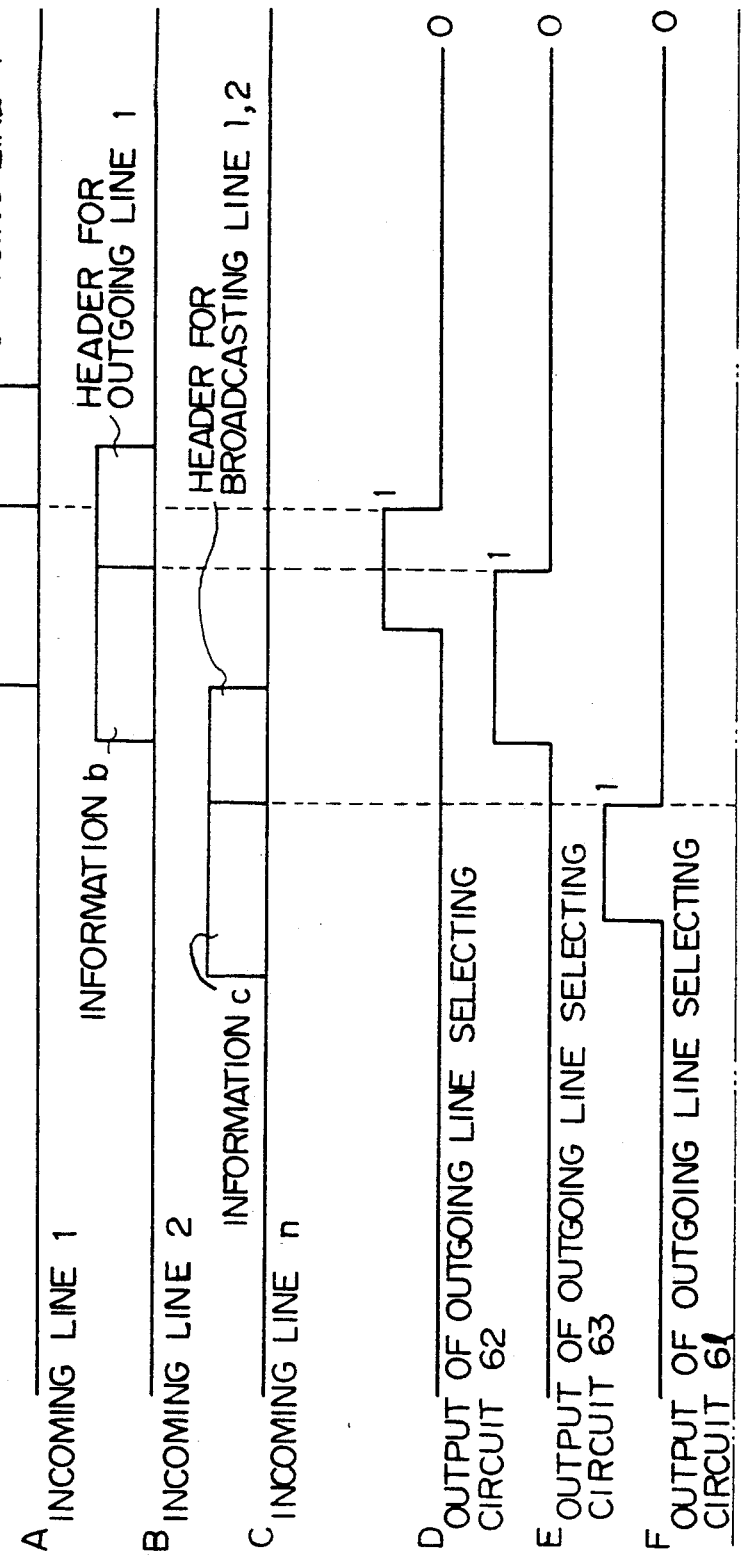

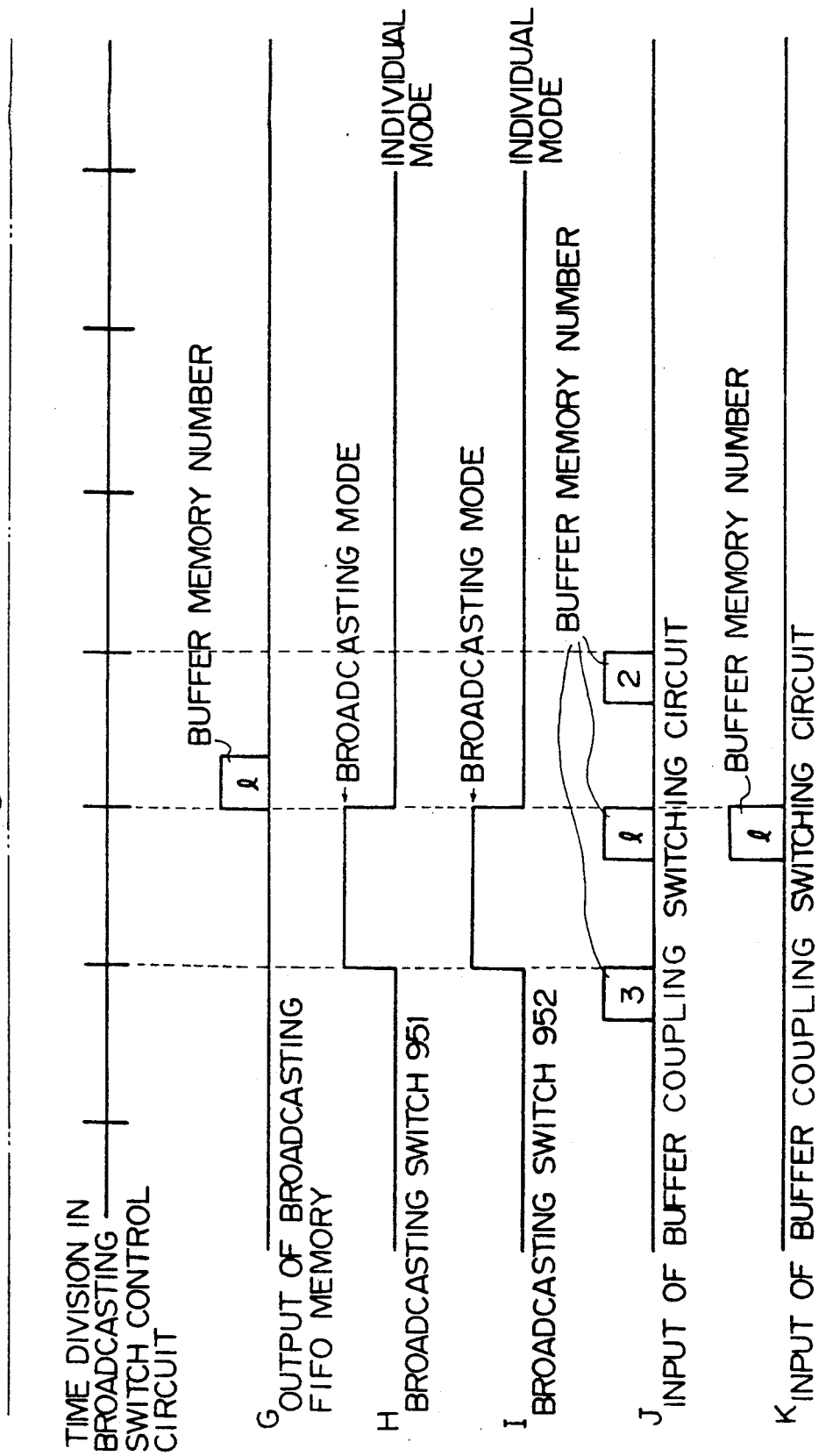

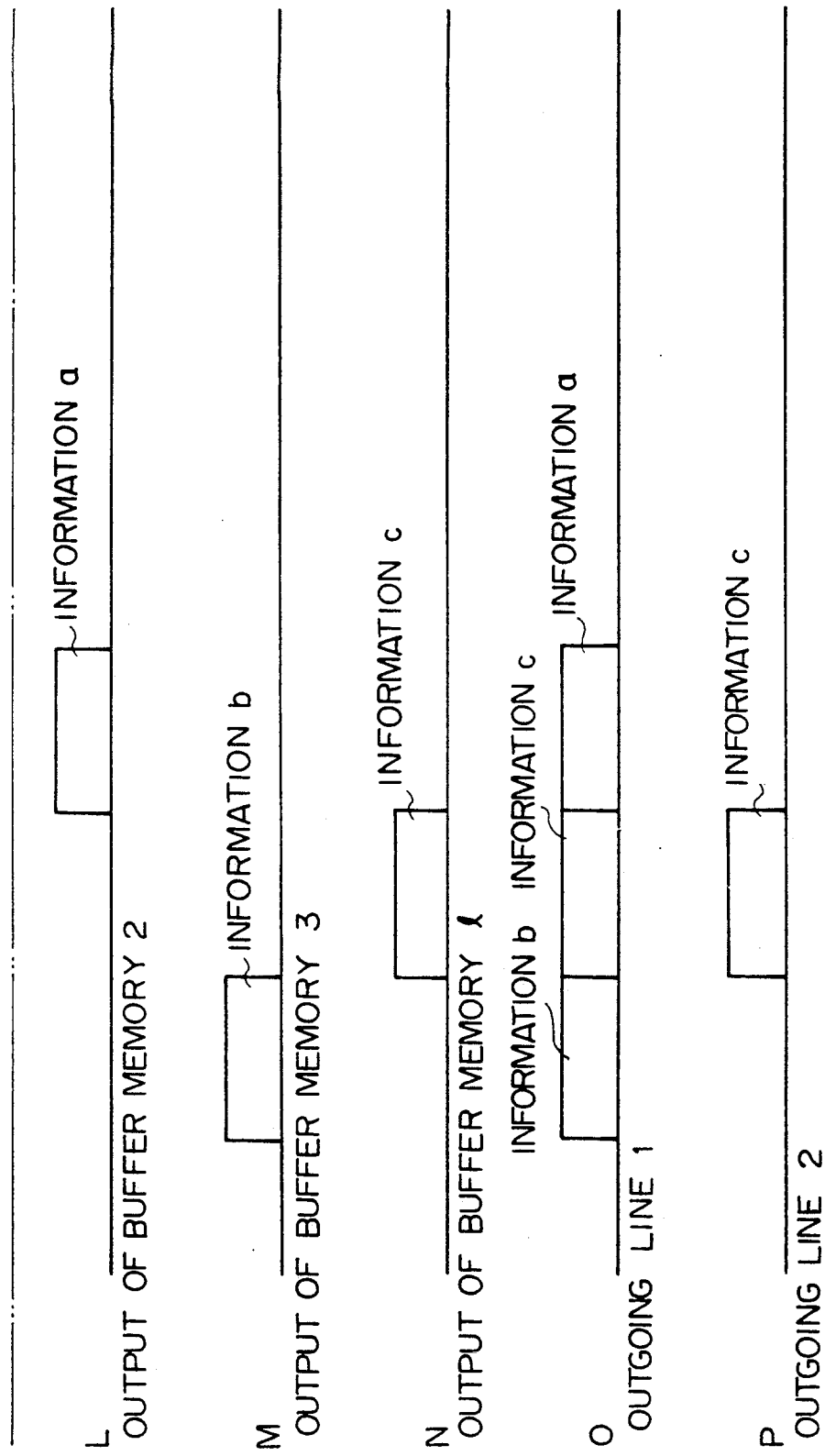

DATA EXCHANGE APPARATUS

BACKGROUND OF THE INVENTION

1. Field of the Invention

The present invention relates to a data exchange apparatus for high-speed exchange of multimedia information such as sound, data and picture information.

2. Description of the Prior Art

FIG. 10 shows one example of the switching network of a typical conventional data exchange apparatus. The switching network shown in FIG. 10 is the so-called BANYAN network, which is one example of the system in which data is divided into predetermined units called packets and the header information of each packet is directly referred to by hardware means to thereby perform high-speed switching.

In the figure, the reference symbols a and b denote input packets, while the reference numeral 1 denotes incoming lines, 2 outgoing lines, and T denotes 2×2 unit switches.

In operation, each of the 2×2 unit switches T shown in FIG. 10 performs a switching operation in accordance with the state of the corresponding bit in the bit string constituting the header section of the input packet a. For example, each of the unit switches Ta that are arrayed in the first row from the left as viewed in FIG. 10 performs a switching operation such that, if the top bit in the header section is 0, the switch Ta couples the input line thereof to the upper output line thereof, whereas, if the top bit is 1, it couples the input line to the lower output line. The switches Tb that are arrayed in the second row from the left similarly perform a switching operation in accordance with the state of the second bit in the header section of the input packet a. If such unit switches are interconnected as shown in FIG. 10 and the number of a desired outgoing line 2 is expressed as a binary number and put to the top of the packet a, the packet a arrives at the desired outgoing line 2 no matter from which incoming line 1 it is inputted.

For example, assuming that the input packets a and b have "1001" as the number of a desired outgoing line 2, as shown in the figure, these packets a and b are always outputted to the one $O_9$ of the outgoing lines 2 no matter from which incoming lines 1 they are inputted. The input packet a is outputted to the outgoing line $O_9$ via the unit switches Te, Tg, Th and Ti, and the input packet b is similarly outputted to the outgoing line $O_9$ via the unit switches Tf, Tg, Th and Ti.

The conventional data exchange apparatus having the above-described arrangement suffers, however, from the following problems. If packets a and b which are directed to the same one $O_9$ of the outgoing lines 2, as in the case of FIG. 10, are simultaneously inputted to the incoming lines 1, blocking (collision) occurs at the unit switch Tg, resulting in either one of the packets a and b being lost. In addition, the prior art apparatus needs a high-speed memory in order to perform high-speed data exchange. Further, the conventional data exchange apparatus is adapted for individual packets and therefore arranged such that a packet which is inputted from one incoming line 1 is led to only one outgoing line 2 designated by the header. Accordingly, the prior art apparatus is incapable of satisfactorily functioning with respect to broadcasting packets which are each to be inputted from one incoming line 1 and led to a plurality of outgoing lines 2 simultaneously.

SUMMARY OF THE INVENTION

In view of the above-described problems of the prior art, it is an object of the present invention to provide a data exchange apparatus which neither gives rise to the problem of blocking occuring at a unit switch nor the possibility of data being lost even if a plurality of pieces of data are concentrated in one outgoing line, and which is capable of performing high-speed data exchange without the need for a high-speed memory.

It is another object of the present invention to provide a data exchange apparatus which is capable of broadcasting when receiving a broadcasting packet.

(1) In the data exchange apparatus according to the present invention, data which arrive at incoming lines are temporarily stored in common buffer memories, respectively by a vacant buffer selecting means, and the identification information of these buffer memories is respectively stored in storage memories provided in correspondence to outgoing lines on the basis of the destination of information of the data in a predetermined order, for example, in the order of arrival of data. If data arrive simultaneously, the identification information of the buffer memories stored with these data is stored in respective storage memories in a predetermined order of priority, and the stored data are outputted by an outgoing line selecting means to the desired outgoing lines according to the order of priority given to the identification information of the buffer memories stored in the storage memories. Accordingly, even if data which are to be outputted to the same outgoing line are simultaneously received, no data will be lost.

(2) If memories which are cabable of reading and writing data in the order of arrival are used for the above-described buffer memories, it is possible to increase the speed of the data input/output operation.

(3) If the buffer memories are accessible independently of each other, i.e., without affecting each other, it is possible to effect a high-speed processing operation without the need for a high-speed memory.

(4) If the buffer memories are divided into groups and a vacant buffer selecting means is provided in correspondence to each buffer memory group, then, even if one buffer memory group becomes congested, there is no effect on the other buffer memory groups.

(5) If storage memories and outgoing line selecting means are provided to correspond to priority levels and processing is executed in sequence from a buffer memory the identification information for which has been stored in a storage memory of higher priority, it is possible to process data in order of priority.

(6) Further, in the data exchange apparatus according to the present invention, data arriving at incoming lines are temporarily stored in common buffer memories and subjected to a procedure to discriminate between broadcasting data and non-broadcasting data. If the input data are broadcasting data, the identification information of the buffer memories stored with these data is written in a broadcasting storage memory provided exclusively for broadcasting, in a predetermined order, for example, in the order of arrival of broadcasting data. If data arrive simultaneously, the identification information of the buffer memories stored with these data is written in a predetermined order of priority. Next, the broadcasting data are simultaneously outputted only to a plurality of outgoing lines which are the destination of broadcasting, according to the order of priority given to the identification information of the buffer memories stored in the storage memory, with priority being given to non-broadcasting data, and non-broadcasting data being individually outputted to other outgoing lines, with all the outgoing lines being synchronized with each other. When there is no broadcasting data, non-broadcasting data are individually outputted to any desired outgoing lines. With such a data exchange apparatus, since the buffer memories are read synchronously with respect to all the outgoing lines, there is no fear of a collision between broadcasting data and non-broadcasting data. Further, since reading of buffer memories for broadcasting is simultaneously executed, there is no fear of the buffer memories being erased prematurely.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 1, including FIGS. 1A and 1B, is a diagram showing one example of the arrangement of the data exchange apparatus according to the present invention;

FIG. 2 is a chart exemplarily showing the signal format and sequence at various portions in the arrangement shown in FIG. 1;

FIG. 4, including FIGS. 4A and 4B, is a diagram showing one example of the arrangement of a control circuit for coupling together an incoming line receiving a packet and a vacant buffer memory;

FIG. 7 is a chart exemplarily showing the signal format and sequence at various portions in the arrangement shown in FIG. 6;

FIG. 8, including FIGS. 8A to 8F, is a diagram showing one example of the arrangement of a broadcasting means employed in the common buffer type data exchange apparatus according to the present invention;

FIG. 9, including FIGS. 9A to 9C, is a chart exemplarily showing the signal format and sequence at various portions in the arrangement shown in FIG. 8.

DETAILED DESCRIPTION OF THE PREFERRED EMBODIMENTS (1) One embodiment of the present invention will be described below with reference to the accompanying drawings.

Figure 1B:
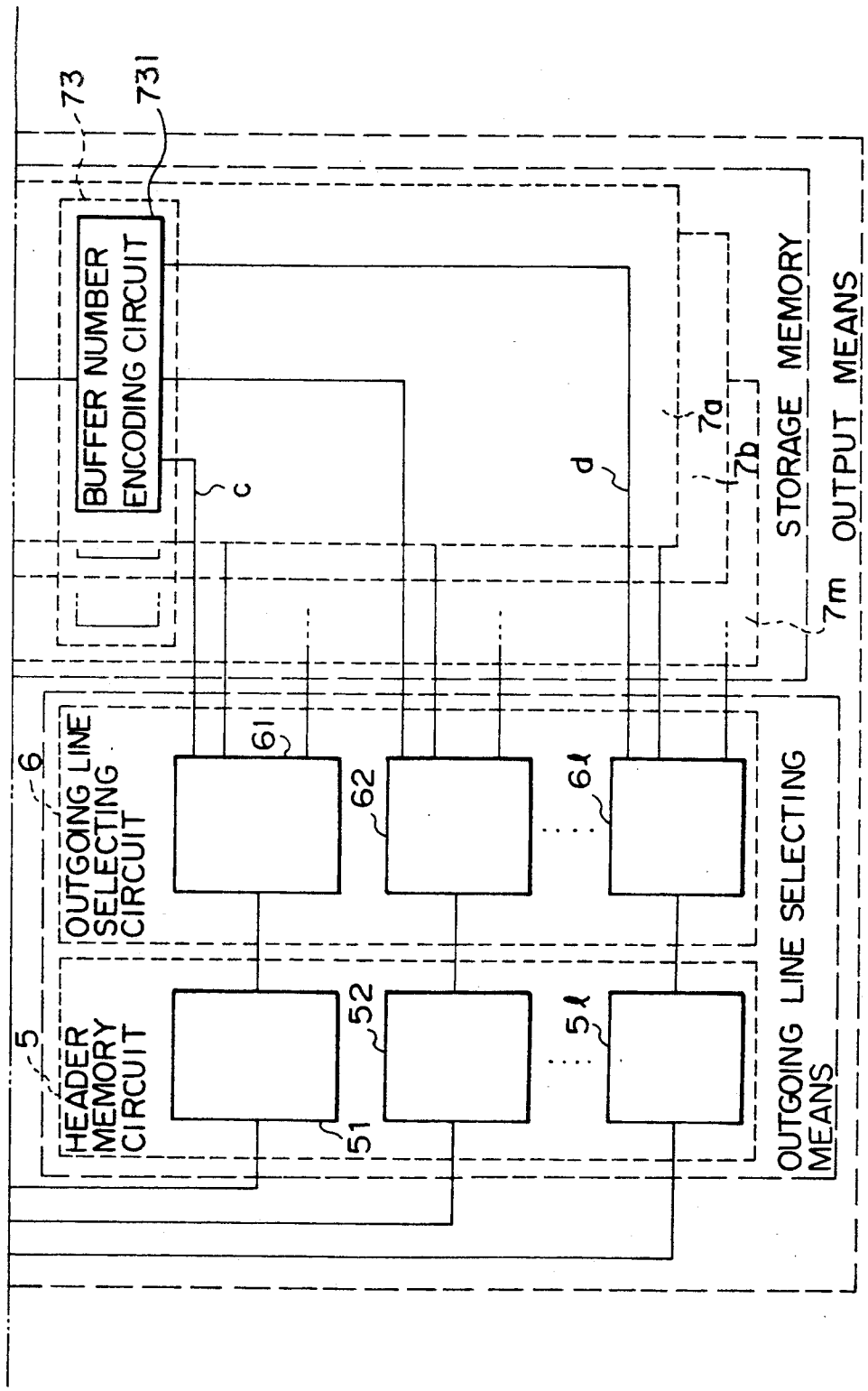

Referring to FIG. 1, the reference numeral 1 denotes incoming lines, 2 outgoing lines, 3 a vacant buffer selecting switching circuit serving as a vacant buffer selecting means, 4 a buffer memory, 5 a header memory circuit (a header memory means), 6 an outgoing line selecting circuit, 71 a buffer coupling switching circuit provided in correspondence to each outgoing line 2, 72 a first-in first-out (hereinafter referred to as FIFO) memory which stores buffer memory identification information in a predetermined order, and 73 a buffer number encoding circuit (an encoding means). In this embodiment, the header memory circuit 5 and the outgoing line selecting circuit 6 constitute in combination an outgoing line selecting means, and the buffer coupling switching circuit 71 constitutes a buffer coupling means.

In the arrangement shown in the figure, the number of incoming lines is n, the number of buffer memories is l, and the number of outgoing lines is m. Accordingly, the reference numerals 41, 42 . . . 4l denote l buffer memories which are accessible independently of each other, 51, 52 . . . 5l header memory circuits, and 61, 62 . . . 6l outgoing line selecting circuits. In addition, the reference numerals 711, 712 . . . 71m denote m buffer coupling switching circuits, 721, 722 . . . 72m m FIFO memories, and 731, 732 . . . 73m m buffer number encoding circuits, although only one is shown in the figure as being a representative of each group of circuits or memories for simplification. ①  to ⓝ which are put at the incoming lines 1 denote the respective numbers of the incoming lines 1, ① to ① at the buffer memory 4 denote the buffer numbers, and ① to ⓜ at the outgoing lines 2 denote the respective numbers of the outgoing lines 2.

The FIFO memories 72 and the buffer number encoding circuits 73 constitute in combination a storage memory, and the outgoing line selecting means, the storage memory and the buffer coupling means constitute an output means.

It is assumed that the storage capacity of the FIFO memory 72 is sufficiently large to store the buffer numbers of all (l) the buffer memories.

FIG. 2 is a chart employed to explain the flow of control carried out in the case where two packets which are addressed to the outgoing line 2① are simultaneously received from the incoming lines 1② and 1ⓝ when the buffer memories 41 and 4l are vacant.

In FIG. 2, the line A shows the signal format at the incoming line 1② shown in FIG. 1; the line B shows the signal format at the incoming line 1ⓝ; the line C shows the one of the outputs of the outgoing line selecting circuit 61 which is delivered to the outgoing line 2①; the line D shows one of the outputs of the outgoing line selecting circuit 61 which is delivered to the outgoing line 2①; the line E shows the output of the FIFO memory 72; the line F shows the output of the buffer memory 41; the line G shows the output of the buffer memory 4l; and the line H shows the output which is delivered to the outgoing line 2①.

In the following description made in connection with FIGS. 1 and 2, packets are employed as one example of the form of input data, and it is assumed that each packet has a fixed length and the header section thereof represents an outgoing line number in coded form.

When a packet arrives at an incoming line 1, the vacant buffer selecting switching circuit 3 selects one vacant buffer memory 4 and couples the incoming line 1 to the selected buffer memory 4 (the operation of the vacant buffer selecting circuit 3 will be described later in detail). The packet inputted from the incoming line 1 is sent to the vacant buffer memory 4 and also supplied to the header memory circuit 5. The header memory circuit 5 extracts only the header section from the packet and stores therein the contents of the header, that is, the number of the desired outgoing line.

The outgoing line selecting circuit 6 outputs "1" to the output line corresponding to the outgoing line number designated by the contents of the header memory circuit 5 and outputs "0" to the output lines corresponding to the other outgoing line numbers, thereby supplying the signals "1" and "0" to the buffer number encoding circuits 73 provided in correspondence to the outgoing lines 2, respectively.

When receiving a signal "1" from the outgoing line selecting circuit 6, the buffer number encoding circuit 73 encodes the number of the buffer memory 4 concerned with the outgoing line selecting circuit 6 and writes it in the FIFO memory 72. If the signal from the outgoing line selecting circuit 6 is "0", the buffer number encoding circuit 73 outputs no signal.

When simultaneously receiving signals "1" from a plurality of outgoing line selecting circuits 6 (i.e., when a plurality of packets are simultaneously received), the buffer number encoding circuit 73 prioritizes these signals "1" during the buffer number encoding processing and successively writes the encoded buffer numbers in the FIFO memory 72, for example, in ascending numerical order.

The buffer coupling switching circuit 71 fetches in order the encoded buffer numbers from the FIFO memory 72 and couples together the buffer memories 4 and the outgoing lines 2 corresponding to the fetched buffer numbers without affecting the connection between the other buffer memories 4 and outgoing lines 2, thus sending the packets written in the buffer memories 4 to the desired outgoing lines 2. Upon completion of the transmission, the buffer coupling switching circuit 71 releases the relevant buffer memories 4 and informs the vacant buffer selecting switching circuit 3 of the completion of the transmission to prepare for reception of the next packet.

The operation of the embodiment will next be explained more specifically with reference to FIG. 2.

It is assumed that, when the buffer memories 41 and 4*l* are vacant, packets which are addressed to the outgoing line 2①  are simultaneously received from the incoming lines 1② and 1⓷, as shown at the lines A and B in FIG. 2. In such a case, the vacant buffer selecting switching circuit 3 prioritizes the incoming lines 1②, 1⓷ and the vacant buffer memories 41, 4*l* and selectively couples them together in ascending numerical order (the operation of the vacant buffer selecting switching circuit 3 will be described later in detail). Accordingly, the incoming line 1② and the buffer memory 41 are coupled together, and so are the incoming line 1⓷ and the buffer memory 4*l*. Thus, the received packets are sent to the buffer memories 41 and 4*l*, respectively. At the same time, the header section of the packet 1 enters the header memory circuit 51, and the outgoing line selecting circuit 61 sets the output line corresponding to the outgoing line number ① to "1", as shown at the line C in FIG. 2. In the meantime, the header section of the packet 2 enters the header memory circuit 5*l*, and the outgoing line selecting circuit 6*l* sets the output line corresponding to the outgoing line number ① to "1", as shown at the line D in FIG. 2.

The buffer encoding circuit 731 stores the FIFO memory 721 with the buffer numbers in ascending numerical order. Accordingly, in the FIFO memory 721, the buffer number ① is put after the buffer number ①.

The buffer coupling switching circuit 711 reads the buffer number ① from the FIFO memory 721, as shown at the line E in FIG. 2, and couples together the buffer memory 41 and the outgoing line 2① to deliver the packet 1 written in the buffer memory 41 to the outgoing line 2①. More specifically, the output of the buffer memory 41, that is, the signal shown at the line F in FIG. 2, is outputted to the outgoing line 2① as shown by the packet 1 at the line H in FIG. 2.

Upon completion of delivery of the packet 1 written in the buffer memory 41, the buffer coupling switching circuit 711 reads the next data from the FIFO memory 721, that is, the buffer number ①, as shown at the line E in FIG. 2, and therefore couples together the buffer memory 4*l* and the outgoing line 2①, thereby delivering the packet 2 already written in the buffer memory 4*l* to the outgoing line 2①. More specifically, the output of the buffer memory 4*l*, that is, the signal shown at the line G in FIG. 2, is outputted to the outgoing line 2① subsequently to the packet 1, as shown by the packet 2 at the line H in FIG. 2.

According to the above-described control operation, even if packets which are addressed to the same outgoing line are simultaneously received from a plurality of incoming lines, these packets are prioritized so as to be serially delivered. There is therefore no danger of the packets being lost due to blocking (collision) as in the case of the prior art.

One example of the arrangement of the vacant buffer selecting circuit 3 will next be explained with reference to FIGS. 3 and 4.

Figure 3:
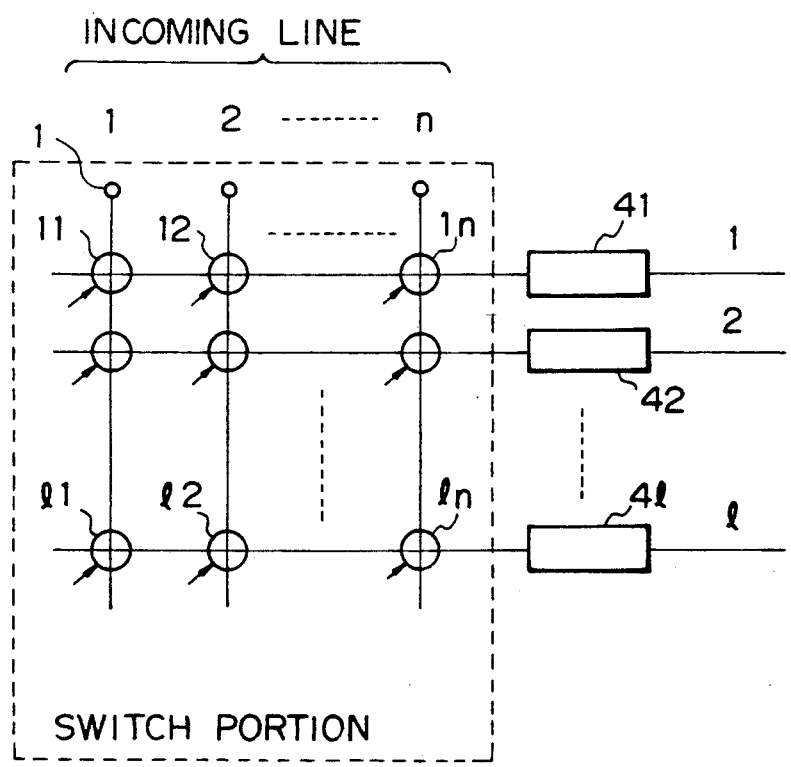
FIG. 3 is a diagram showing one example of the switch for coupling together an incoming line and a buffer memory in the arrangement shown in FIG. 1.

FIG. 3 shows the signal switch portion of the vacant buffer selecting switching circuit 3. In the figure, the reference numeral 1 denotes incoming lines, 41, 42 ... 4*l* buffer memories, and 11, 12 ... 1n, 11, 12 ... ln switching elements.

Figure 4B:
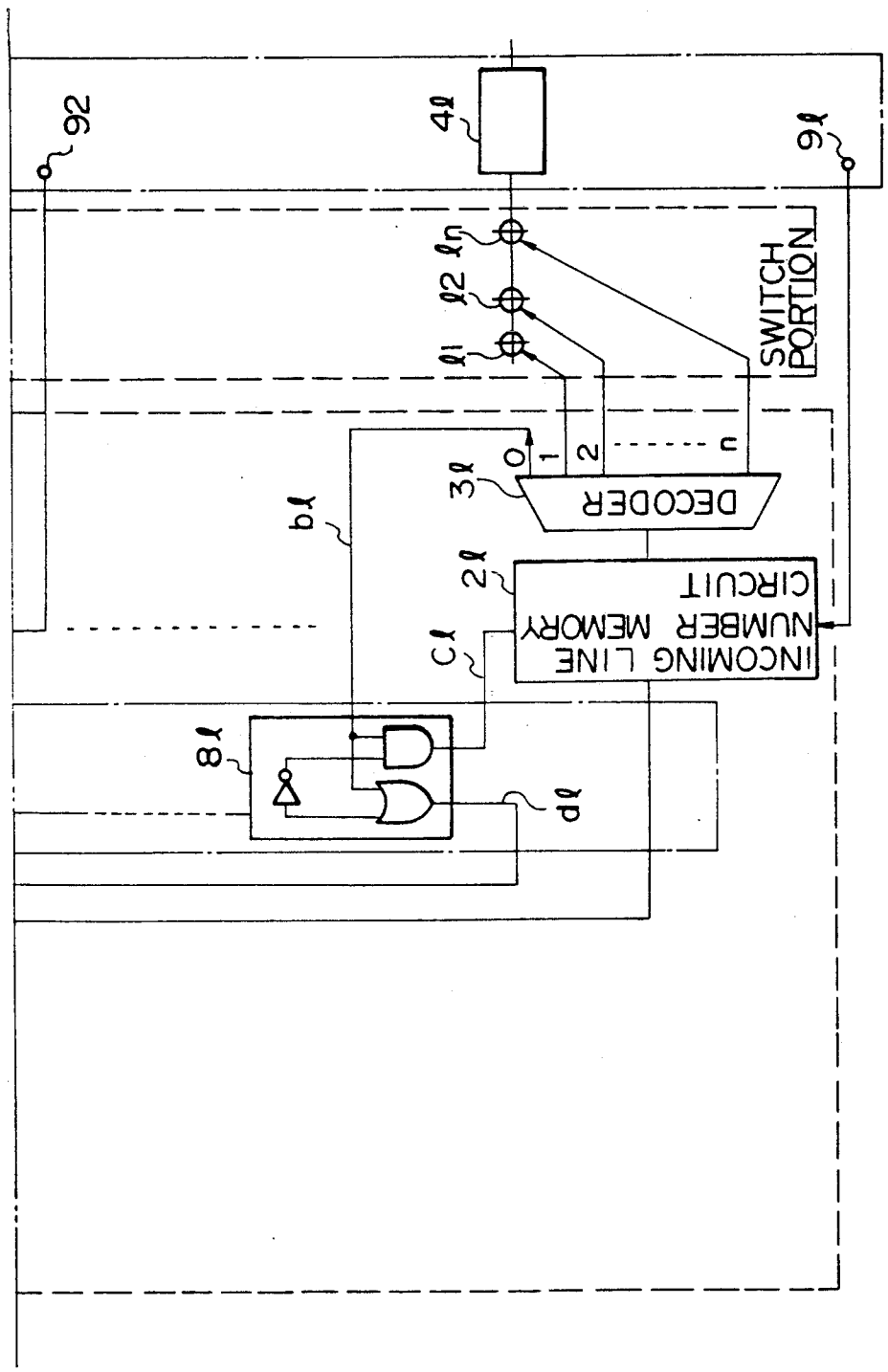

FIG. 4 is a diagram showing the control portion of the vacant buffer selecting switching circuit 3, in which the reference numeral 1 denotes incoming lines, 1a, 1b ... 1n incoming indicating circuits (an incoming indicating means), 30 a priority encoder, 41, 42 ... 4*l* buffer memories, 21, 22 ... 2*l* incoming line number memory circuits provided to correspond to the buffer memories, 31, 32 ... 3*l* decoders provided to correspond to the buffer memories, and 11, 12 ... 1n, 21, 22 ... 2n, 11, 12 ... ln the switching elements shown in FIG. 3. The reference numeral 8 denotes a buffer selection priority control circuit which is arranged on the assumption that a buffer memory with a lower ordinal number has a higher priority level. The reference numerals 81, 82 ... 8*l* denote buffer selection priority control circuits provided to correspond to the buffer memories, in which the circuit 81 is different from the circuit 82 and those which are subsequent thereto because the buffer number 1 always takes first priority.

The input lines b1, b2 ... b*l* of the buffer selection priority control circuit 8 carry buffer memory vacancy indicating signals, the output lines c1, c2 ... c*l* of the buffer selection priority control circuit 8 carry priority judgement result accepting signals, and the signal lines d1, d2 ... d*l* inside the buffer selection priority control circuit 8 carry higher level vacancy indicating signals indicating the vacancy of buffer memories with higher priority levels. In particular, d*l* is a higher level vacancy indicating signal which indicates that there is at least one vacant buffer memory and which also serves as a gate signal supplied to the gate of the priority encoder 30.

The buffer selection priority control circuit 81, which has the highest priority level, accepts the buffer memory vacancy indicating signal b1 whenever the buffer memory 41 is vacant. The buffer memory vacancy indicating signal line b1 is therefore coupled directly to the accepting signal line c1 and the priority buffer vacancy indicating signal line d1.

The reference numerals 91, 92 ... 9l denote buffer release signals from the buffer memories 41, 42 ... 4l, respectively.

The reference numeral 10 denotes a decoding circuit (decoder).

The decoding circuit 10, the priority encoder 30, the buffer selection priority control circuit 8, the incoming line number memory circuits and the decoders constitute in combination a selecting means.

The operation of the vacant buffer selecting switching circuit 3 will be explained below with reference to FIGS. 3 and 4.

The arrows that are respectively put to the switching elements 11, 12 ... ln shown in FIG. 3 indicate control lines. For example, the switching element 11 is activated, when the associated control line is turned ON, so as to connect together the incoming line 1① and the buffer memory 41 independently of the other switching elements, without affecting the other incoming lines and the other buffer memories. When the control line is turned OFF, the switching element 11 disconnects the incoming line 1① from the buffer memory 41.

The control lines are respectively coupled to the decoders 31, 32 ... 3l shown in FIG. 4. Thus, the decoders 31, 32 ... 3l decode the contents of the incoming line number memory circuits 21, 22 ... 2l to turn ON the control line associated with the switching element corresponding to the incoming line number concerned and turn OFF the control lines associated with the other switching elements, thereby coupling together the corresponding buffer memory and incoming line independently of the input operation of the other buffer memories. In addition, the buffer memory vacancy indicating signals b1, b2 ... bl corresponding to the decoders are set to "0"(in use).

Since the incoming line number memory circuits 21, 22 ... 2l and the decoders 31, 32 ... 3l are provided in correspondence to the buffer memories 4, the buffer memories 4 corresponding to the incoming line number memory circuits 21, 22 ... 2l are connected to the incoming lines indicated by the contents of the circuits 21, 22 ... 2l.

The incoming line number memory circuits 21, 22 ... 2l are arranged such that, when any of these circuits receives the corresponding one of the buffer release signals 91, 92 ... 9l, the storage contents thereof are forcibly reset to zero. When the contents of an incoming line number memory circuit are reset to zero, the decoder that is coupled to this incoming line number memory circuit turns off the control line associated with the corresponding switching element and sets the buffer memory vacancy indicating signal to "1" to inform the buffer selection priority control circuit 8 that the corresponding buffer memory is vacant.

When any of the incoming line number memory circuits 21, 22 ... 2l receives the corresponding one of the accepting signals c1, c2 ... cl from the buffer selection priority control circuit 8, it reads the output signal delivered through the signal line h from the priority encoder 30.

The buffer selection priority control circuit 8 is exemplarily arranged on the assumption that the buffer memories 4 are given priority levels in ascending numerical order, i.e., the lower the ordinal buffer memory number, the higher the priority level.

Assuming that the buffer memory 41 is vacant, the buffer memory vacancy indicating signal b1 is "1" and the accepting signal c1 is "1". At this time, the other accepting signals c2 ... cl are "0" even if the other buffer memories are vacant, that is, even if the vacancy indicating signals b2 ... bl are "1". Accordingly, the buffer memory 41 is selected as a vacant buffer.

If the buffer memory 41 is being used and the buffer memory 42 is vacant, the vacancy indicating signals b1 and b2 are "0" and "1", respectively, and the accepting signals c1 and c2 are "0" and "1", respectively. At this time, even if the buffer memories other than the memory 42 are vacant, the accepting signals other than the signal c2 are "0". Accordingly, the buffer memory 42 is selected as a vacant buffer.

The higher level vacancy indicating signal (gate signal) dl, which is an output of the buffer selection priority control circuit 8, is set to "1" whenever at least one of the buffer memories 41, 42 ... 4l is vacant, to open the gate of the priority encoder 30.

The incoming indicating circuits 1a, 1b ... 1n are provided in correspondence to the incoming lines 1. When incoming data is detected from an incoming line 1, the output of the corresponding incoming indicating circuit is set to "1", which is reset to "0" by the decoding circuit 10.

The priority encoder 30 encodes the lowest one of the numbers of the incoming lines 1 whose corresponding incoming indicating circuits 1a, 1b ... 1n output "1", and if the gate signal dl is "1", the priority encoder 30 outputs the encoded incoming line number to the signal line h. If the gate signal dl is "0", the encoder 30 outputs "0" to the signal line h.

The decoding circuit 10 decodes the signal carried by the signal line h and resets the incoming indicating circuit corresponding to the accepted incoming line number to cancel the incoming indication.

The following is a description of the process of selecting incoming lines and buffer memories in ascending numerical order and coupling them together in the case where signals are simultaneously received at the incoming lines 1② and 1ⓝ and the buffer memories 41 and 4l are vacant.

Referring to FIG. 4, when signals are simultaneously received at the incoming lines 1② and 1ⓝ, both the incoming indicating circuits 1b and 1n output "1", so that the priority encoder 30 first encodes the lower incoming line number 2 and outputs it to the signal line h.

In the meantime, when the buffer memories 41 and 4l are vacant, the buffer vacancy indicating signals b1 and bl are "1", while the other buffer vacancy indicating signals are "0", and the buffer selection priority control circuit 8 sets only the accepting signal c1 to "1" and the other signals c2 ... cl to "0" and opens the gate of the priority encoder 30.

As the accepting signal c1 is set to "1", the incoming line number memory circuit 21 reads the output of the priority encoder 30 that is delivered to the signal line h and the decoder 31 decodes it to turn ON the control line associated with the switching element 12, thereby coupling together the incoming line 1② and the buffer memory 41. Further, the vacancy indicating signal b1 is set to "0" to indicate that the buffer memory 41 is in use. The decoding circuit 10 decodes the output signal carried by the signal line h and resets the incoming indicating circuit 1b corresponding to the incoming line 1② to thereby reset the output thereof to "0". Then, the priority encoder 30 encodes the incoming line number $\textcircled{n}$ corresponding to the incoming indicating circuit $1\textcircled{n}$ the output of which is "1" and outputs the encoded incoming line number $\textcircled{n}$ to the signal line h.

Since, in the buffer memories 4, only the buffer memory 4l is vacant, the buffer vacancy indicating signal b1 is "1", while the other buffer vacancy indicating signals are "0". Accordingly, the buffer selection priority control circuit 8 sets the accepting signal cl to "1" and also sets the gate signal dl to "1" to open the gate of the priority encoder 30. As the accepting signal cl is set to "1", the incoming line number memory circuit 2l reads the output signal carried by the signal line h and the decoder 3l decodes it to turn ON the control line associated with the switching element ln, thereby coupling together the incoming line $1\textcircled{n}$ and the buffer memory 4l. Further, the vacancy indicating signal b1 is set to "0" to indicate that the buffer memory 4l is in use. The decoding circuit 10 decodes the output signal carried by the signal line h and resets the incoming indicating circuit 1n corresponding to the incoming line number $\textcircled{n}$, thereby resetting the output thereof to "0".

Thus, when incoming signals are received from a plurality of incoming lines, if a plurality of buffer memories are vacant, the incoming lines and the buffer memories can be interconnected in ascending numerical order.

Although in the foregoing embodiment, the number of incoming lines is n, the number of buffer memories is l and the number of outgoing lines is m, the numbers of these elements may be selected as desired.

Although the vacant buffer selecting switching circuit shown in FIG. 1 is arranged to select incoming lines and buffer memories preferentially in ascending numerical order, it is possible to employ any desired order of selection as long as no blocking (collision) occurs when a plurality of incoming signals are simultaneously received and a plurality of buffer memories are simultaneously released. The same advantageous effects as those in the foregoing embodiment are obtained regardless of the type of preferential selection.

Although in the foregoing embodiment the header section of each packet represents the number of an outgoing line in coded form, it is also possible to employ a bit string having a length corresponding to the total number of outgoing lines, in which the bits are assigned in one-to-one correspondence to the outgoing lines. In short, it is possible to employ any kind of destination information as long as it can specify a particular outgoing line.

Although in the foregoing embodiment the numbers of buffer memories are employed to specify these buffer memories, any kind of identification information which can specify the buffer memories may be employed, for example, the addresses of the buffer memories.

(2) Modifications of the above-described embodiment will next be explained. Although in the foregoing embodiment a received packet is delivered to an outgoing line after it has temporarily been stored in a buffer memory, the arrangement may be such that received packets are written in memories capable of reading and writing data in the order of arrival, which are employed as buffer memories, and while doing so, the packets are serially delivered to the respective outgoing lines upon completion of preparations for delivery to the outgoing lines after the analysis of the headers of the packets.

Figure 5:
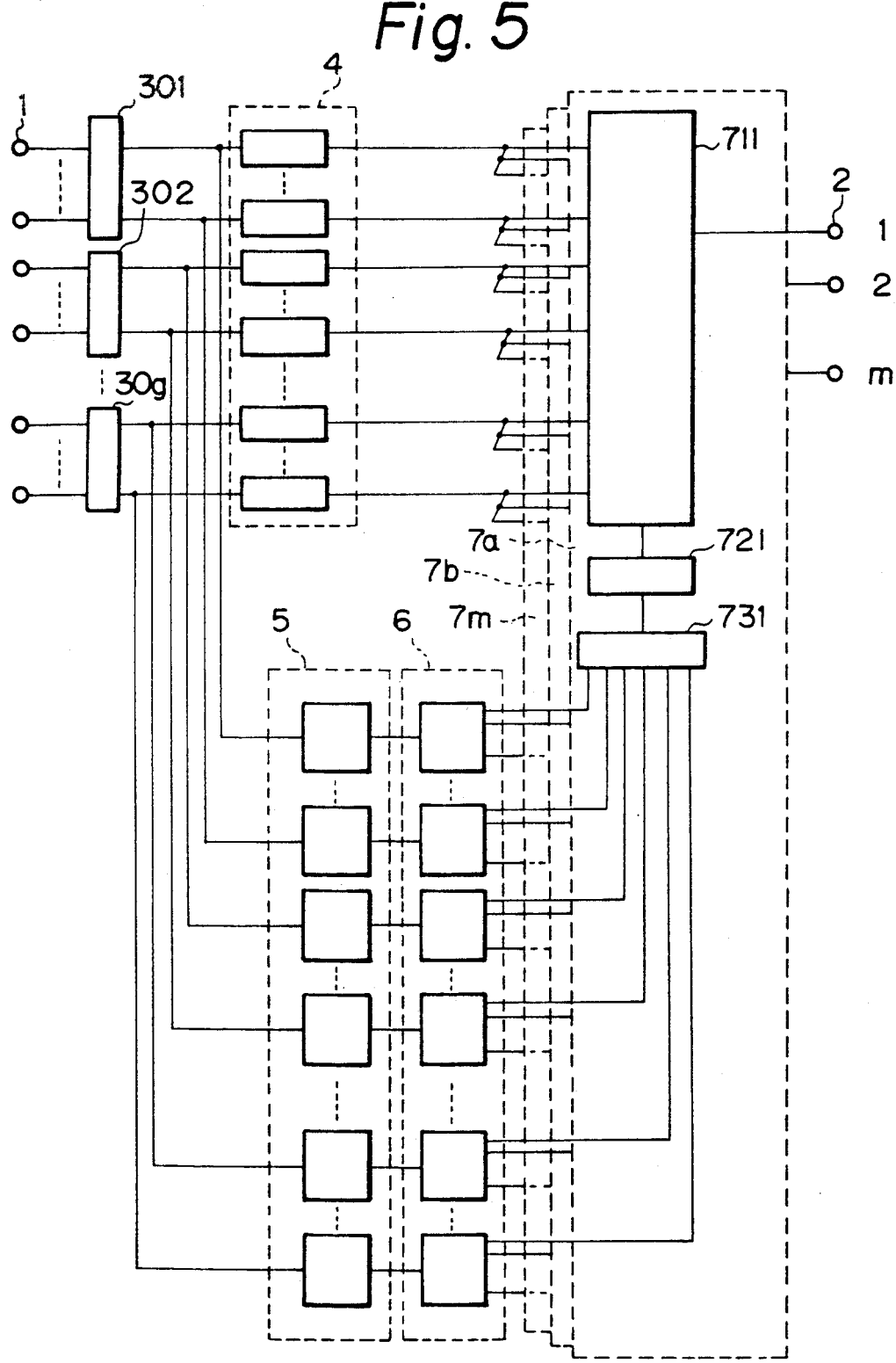
FIG. 5 is a diagram showing one example of the arrangement employed in a modification wherein the incoming lines are divided into groups and a common buffer memory is provided in correspondence to each group.

(3) Although in the foregoing embodiment the buffer memories are mutually used for any desired incoming lines without distinction, the arrangement may be such that the vacant buffer selection switching circuit 3 shown in FIG. 1 is divided into a plurality of groups of switching circuits 301, 302 . . . 30g, as shown in FIG. 5 (the constituent elements in the arrangement shown in FIG. 5 other than the vacant buffer selecting switching circuit are the same as those in FIG. 1) and buffer memories are mutually used within each group. With such an arrangement, it is also possible to obtain the same advantageous effects as those in the above-described embodiment.

(4) In the foregoing embodiment, when a plurality of packets wait to be delivered to the same outgoing line, a packet which has priority over the other packets cannot always be delivered first since the packets are delivered in the order or arrival.

To solve this problem, information indicative of a priority level is added to the header section of each packet, and a number of FIFO memories 72, shown in FIG. 1, which corresponds to the number of priority levels are provided, so that received packets are respectively inputted to FIFO memories which are selected in accordance with the priority levels indicated by the header sections of the packets and the packet in an FIFO memory which has a higher priority level is delivered earlier, thus enabling a packet of higher priority to be delivered earlier when a plurality of packets are waiting to be delivered.

One example of the arrangement for priority control will be explained below with reference to FIG. 6. In the arrangement exemplarily shown in FIG. 6, there are provided two different priority levels for packets, that is, packets are classified into packets of priority and packets of non-priority.

Figure 6:
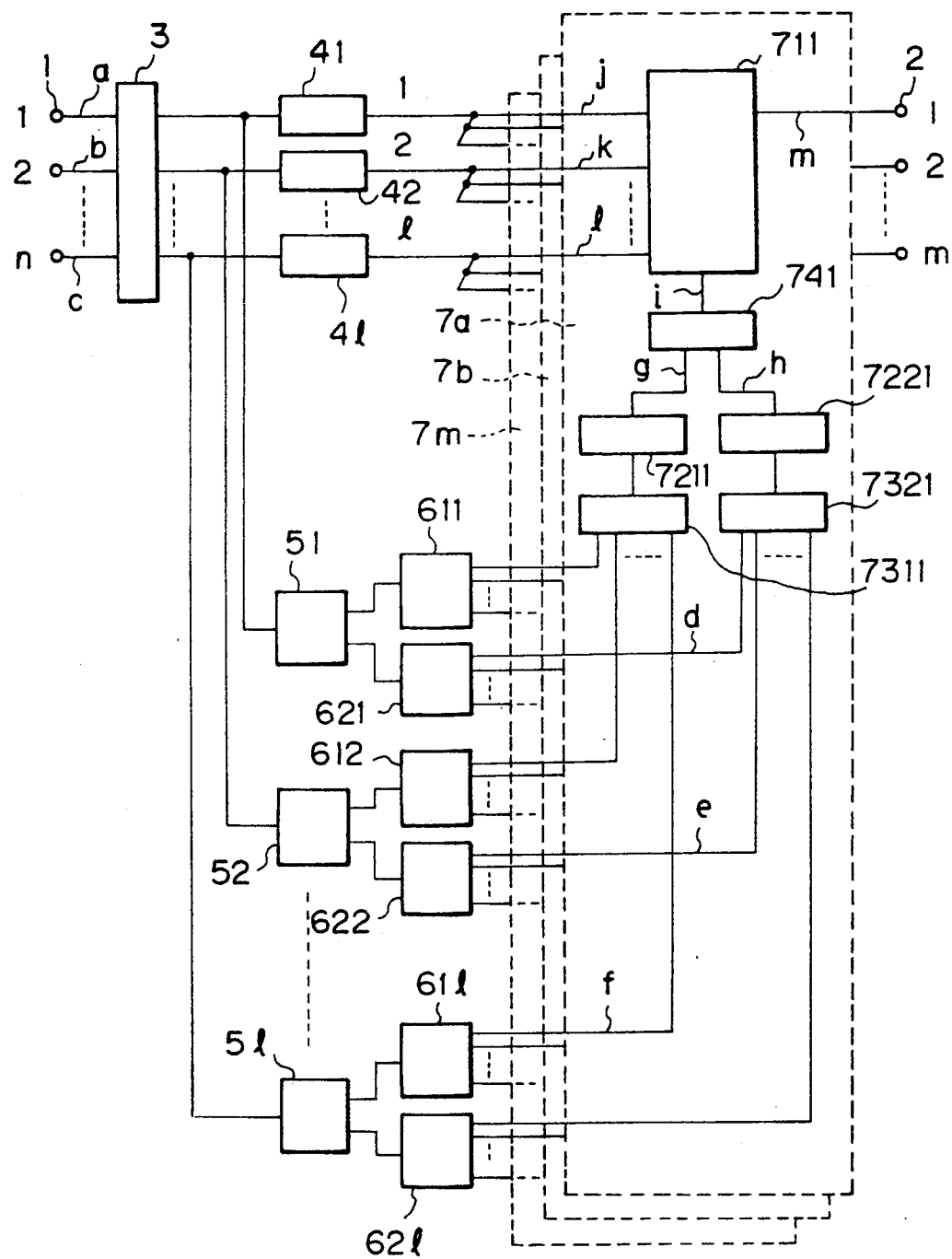
FIG. 6 is a diagram showing one example of the arrangement for priority control.
Figure 8B:
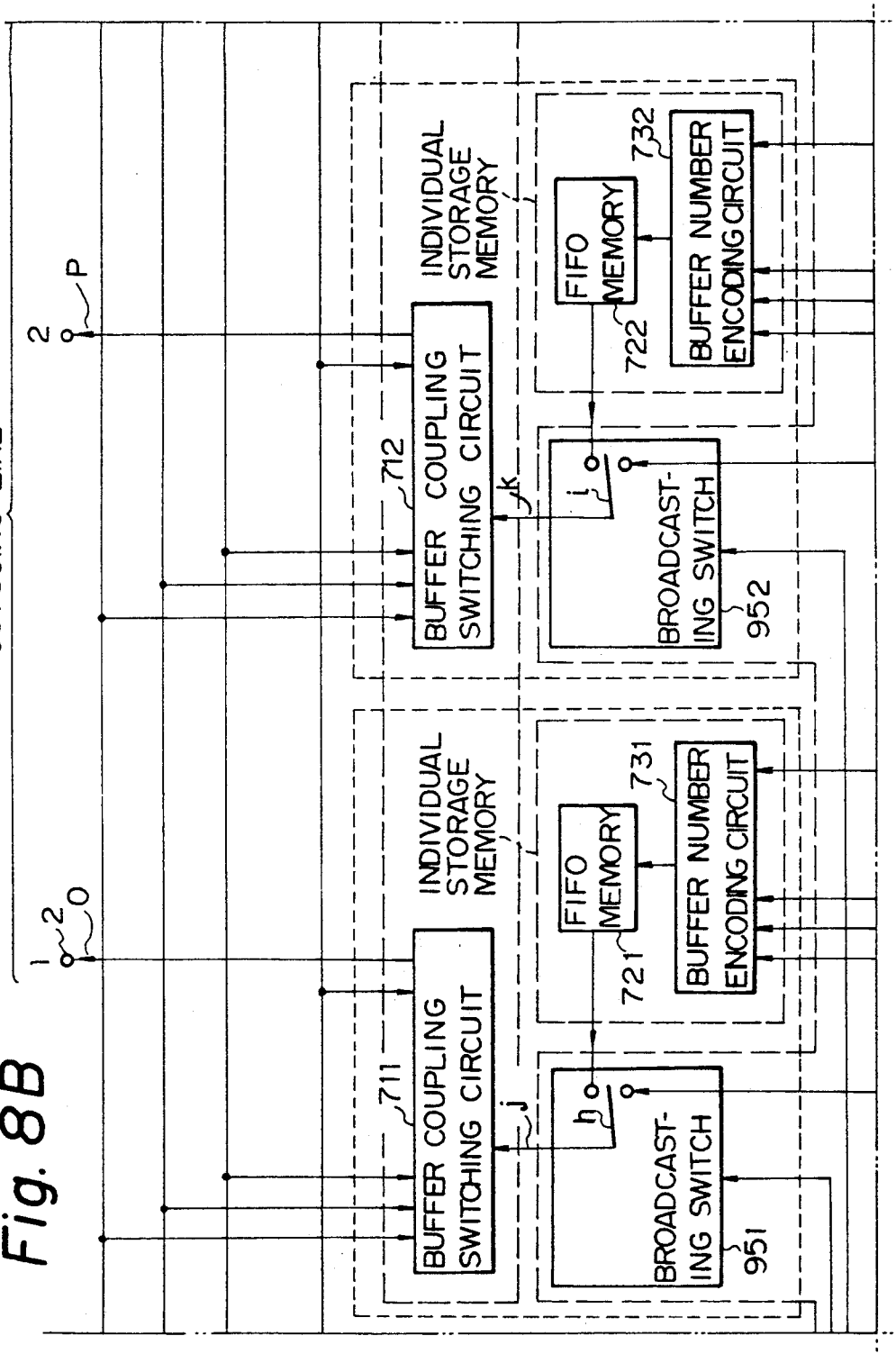
Figure 8C:
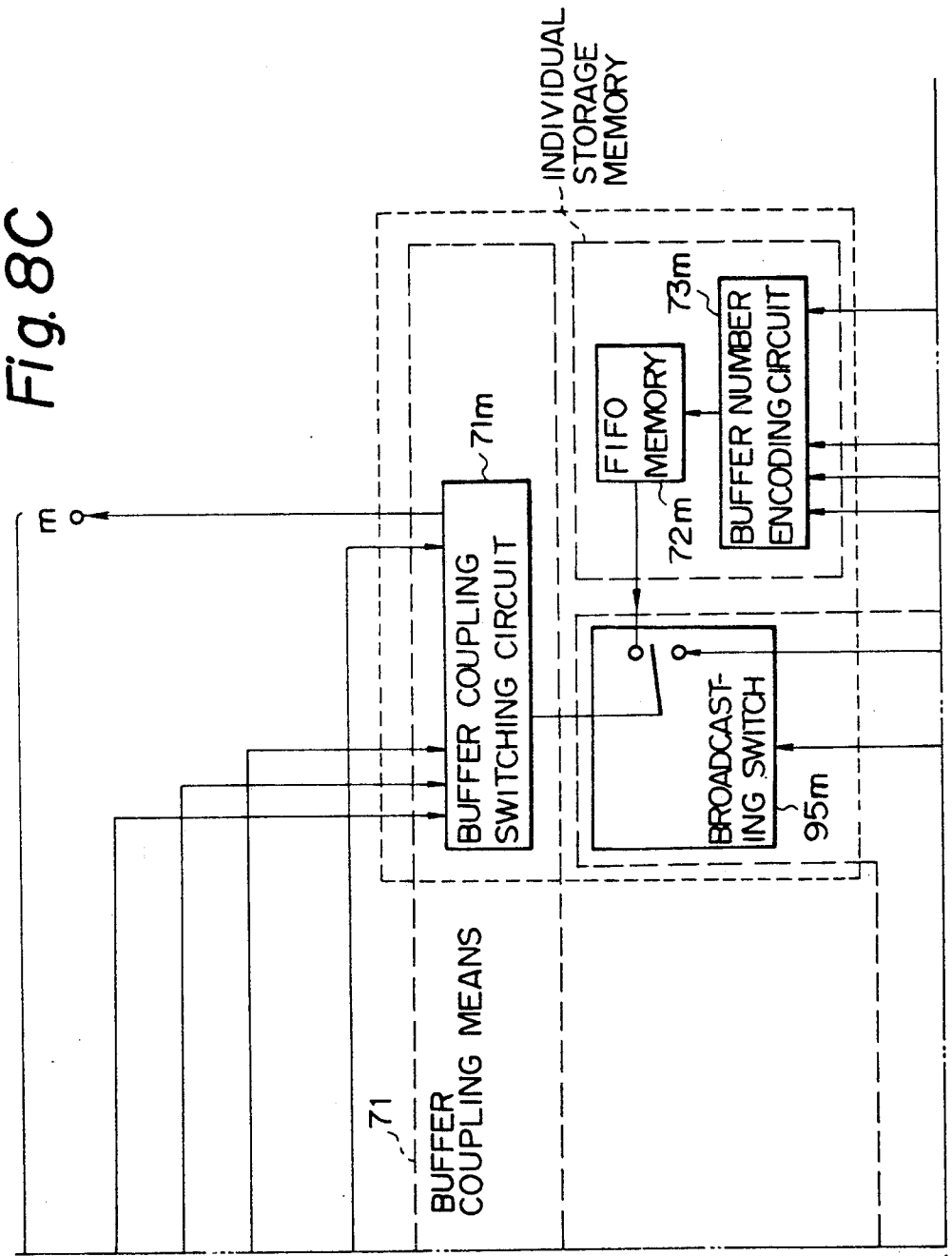
Figure 8D:
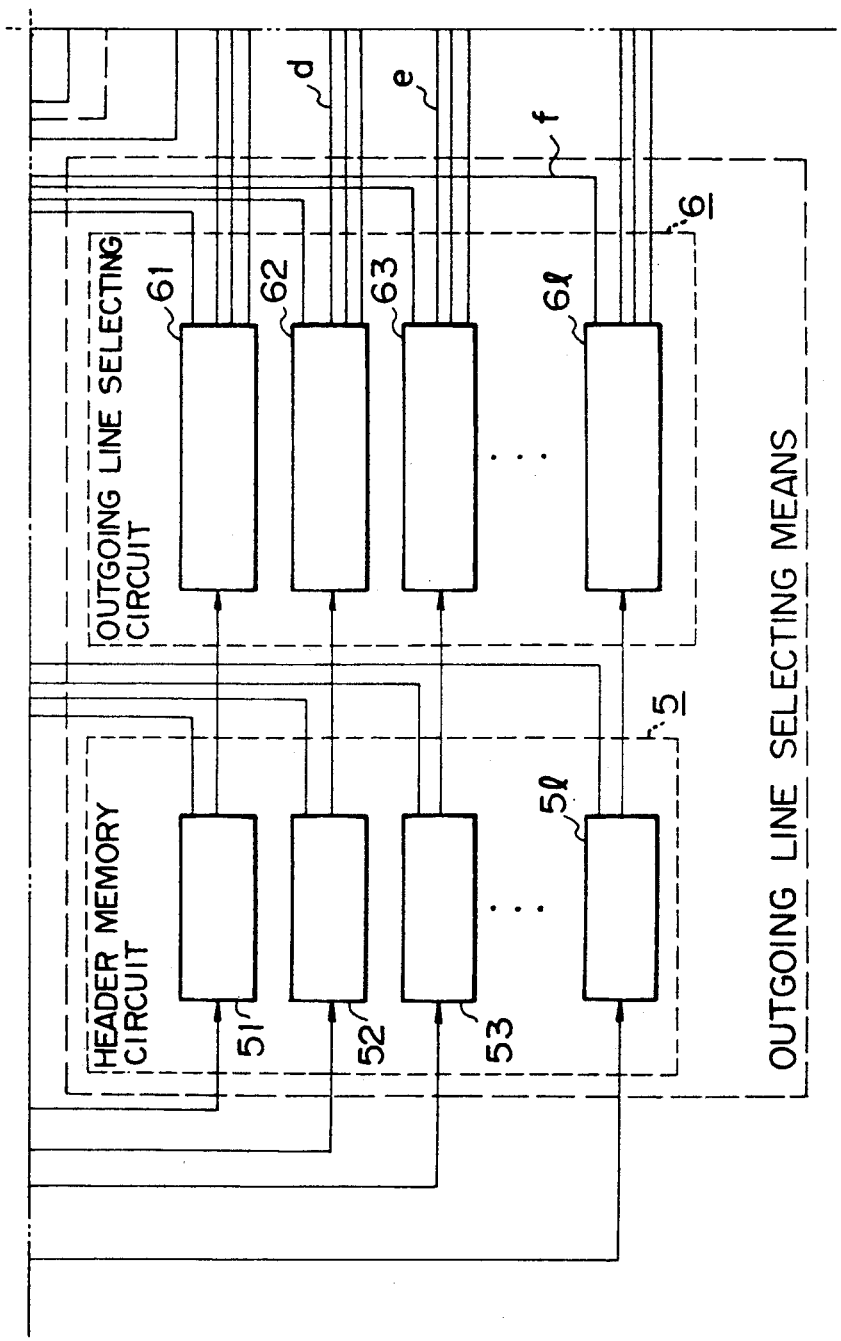
Figure 8E:
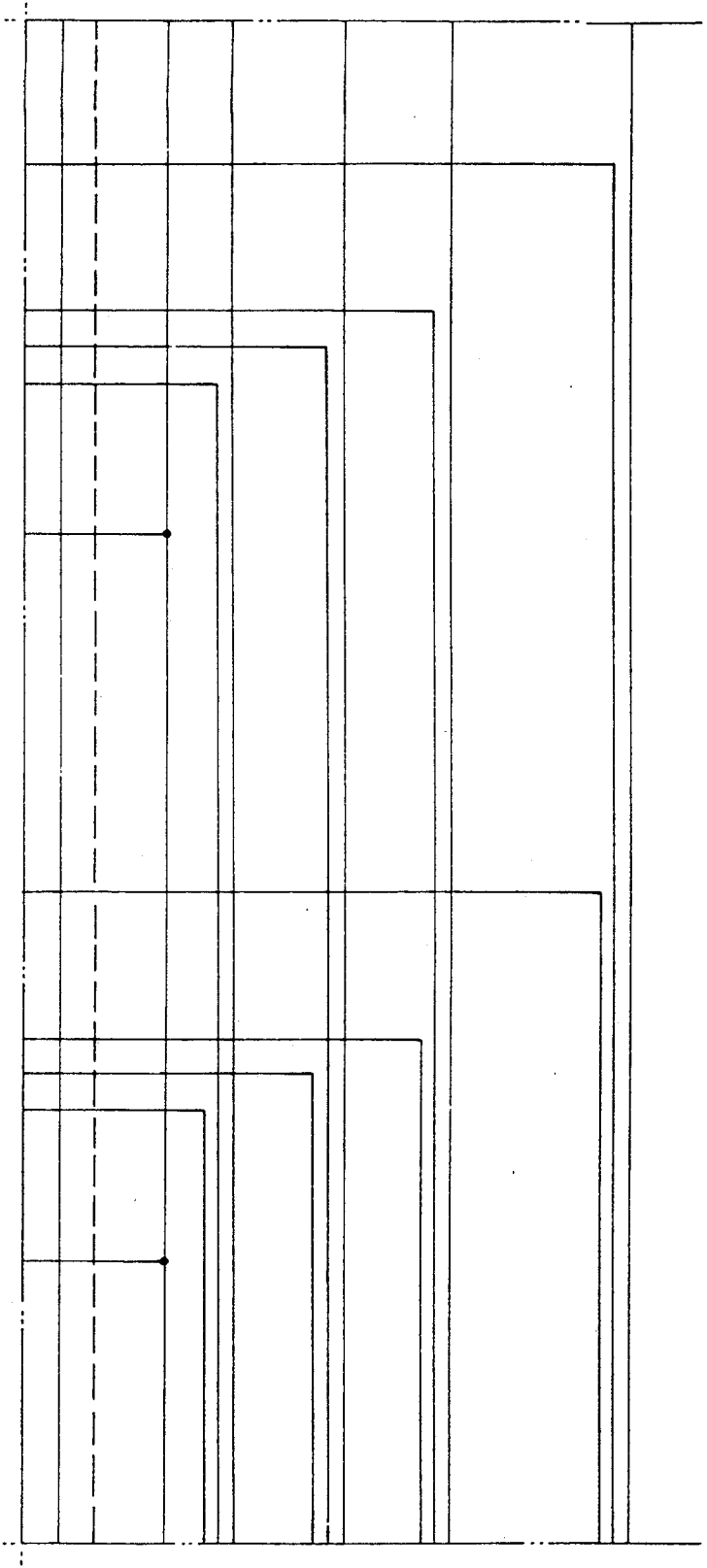
Figure 10:
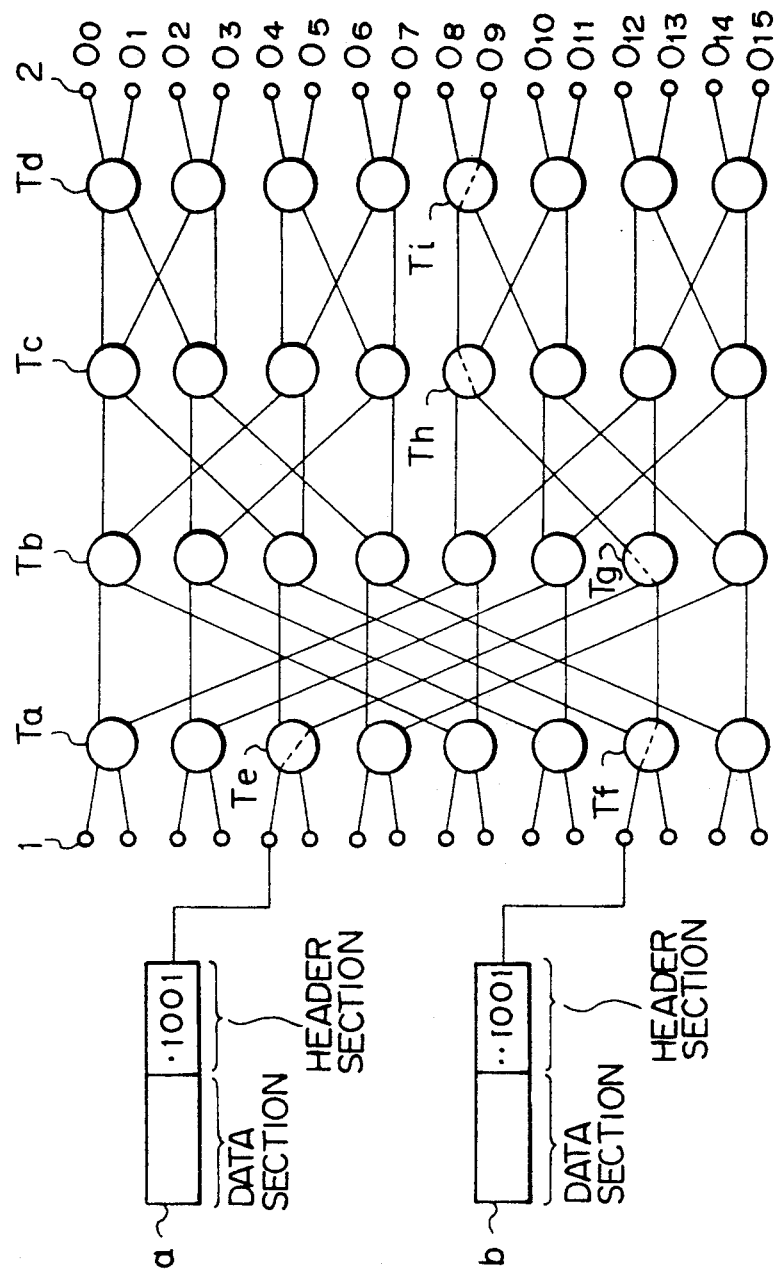
FIG. 10 is a diagram showing the switching network of a conventional data exchange apparatus.

The arrangement shown in FIG. 6 is the same as that shown in FIG. 1 except for the constituent elements denoted by the reference numerals 611, 612 . . . 61l, 621, 622 . . . 62l, 7211, 7212 . . . 721m, 7221, 7222 . . . 722m, 7311, 7312 . . . 731m, 7321, 7322 . . . 732m, and 741, 742 . . . 74m in FIG. 6. In the figure, only some of the corresponding reference numerals are shown for simplification.

The portions of the arrangement which are different from the arrangement shown in FIG. 1 alone will be explained below. In FIG. 6, the reference numerals 611, 612 . . . 61l denote priority outgoing line selecting circuits for packets of priority, and 621, 622 . . . 62l non-priority outgoing line selecting circuits for packets of non-priority, which correspond to the outgoing line selecting circuit 61, 62 . . . 6l shown in FIG. 1.

The reference numerals 7311, 7312 . . . 731m denote priority buffer number encoding circuits for packets of priority, and 7321, 7322 . . . 732m non-priority buffer number encoding circuits for packets of non-priority, which correspond to the buffer number encoding circuits 731, 732 . . . 73m shown in FIG. 1.

The reference numerals 7211, 7212 . . . 721m denote priority FIFO memories for packets of priority, and 7221, 7222 . . . 722m non-priority FIFO memories for packets of non-priority, which correspond to the FIFO memories 721, 722 . . . 72m shown in FIG. 1. The reference numerals 741, 742 . . . 74m denote priority control circuits.

FIG. 7 shows one example of control effected in the case where packets which are addressed to the outgoing line $2\textcircled{1}$ are received from the incoming lines $1\textcircled{1}$, $1\textcircled{2}$ and $1\textcircled{n}$ when three buffer memories 41, 42 and 4l are vacant in the arrangement exemplarily shown in FIG. 6.

It is assumed that packets of non-priority are received from the incoming lines 1①and 1②, while a packet of priority is received from the incoming line 1(n).

In FIG. 7, the lines A, B and C respectively show the signal formats at the incoming lines 1①, 1② and 1(n) shown in FIG. 6; the lines D and E respectively show the outputs to the outgoing line 2① among those of the non-priority outgoing line selecting circuits 621 and 622 shown in FIG. 6; the line F shows the output to the outgoing line 2① among those of the priority outgoing line selecting circuit 61l shown in FIG. 6; the line G shows the output of the priority FIFO memory 7211 that corresponds to the outgoing line 2①; the line H shows the output of the non-priority FIFO memory 7221 that corresponds to the outgoing line 2①; the line I shows the output of the priority control circuit 741 for the outgoing line 2①; the lines J, K and L respectively show the outputs of the buffer memories 41, 42 and 4l; and the line M shows the signal format at the outgoing line 2①.

The following description is made on the assumption that the header section of each packet represents the number of an outgoing line and priority/non-priority in coded form (herein assumed that 1 indicates priority, and 0 non-priority), as shown in FIG. 7, lines A, B and C, and packets 1, 2 and 3 are received in the mentioned order, as shown in FIG. 7, lines A, B and C.

If the packets 1, 2 and 3 shown in FIG. 7, lines A, B and C are received when the buffer memories 41, 42 and 4l are vacant, the vacant buffer selecting switching circuit 3 couples together the incoming lines and the buffer memories in ascending numerical order as shown in the above-described embodiment: the incoming line 1① and the buffer memory 41; the incoming line 1② and the buffer memory 42; and the incoming line 1(n) and the buffer memory 4l. The received packets are sent to the buffer memories 41, 42 and 4l, respectively, and also sent to the header memory circuits 51, 52 and 5l, respectively.

The header sections of the packets 1 and 2 shown in FIG. 7, lines A and B are subjected to priority/non-priority judgement in the header memory circuits 51 and 52, respectively, and the outgoing line numbers indicated by the header sections are sent to the non-priority outgoing line selecting circuits 621 and 622. The outgoing line selecting circuits 621 and 622 set the output lines corresponding to the outgoing line number ① to "1", as shown in FIG. 7, lines D and E.

The header section of the packet 3 shown in FIG. 7, line C is subjected to priority/non-priority judgement in the header memory circuit 5l, and the outgoing line number indicated by the header section is sent to the priority outgoing line selecting circuit 61l. The outgoing line selecting circuit 61l sets the output line corresponding to the outgoing line number ① to "1", as shown in FIG. 7, line F. The non-priority buffer number encoding circuit 7321 corresponding to the outgoing line 2① encodes the signals shown in FIG. 7, lines D and E into respective buffer numbers and puts them into the non-priority FIFO memory 7221 in the order or arrival.

The priority buffer number encoding circuit 7311 encodes the signal shown in FIG. 7, line F into a buffer number and puts it into the priority FIFO memory 7211 after the signals shown in FIG. 7, lines D and E.

If a buffer number has been stored in the priority FIFO memory 7211, the priority control circuit 741 fetches it first, whereas, if no buffer number has been stored in the FIFO memory 7211, the priority control circuit 741 fetches a buffer number stored in the non-priority FIFO memory 7221. Then, the priority control circuit 741 couples together the buffer memory designated by the buffer number and the outgoing line 2① to thereby deliver the packet stored in the buffer memory to the outgoing line 21. Accordingly, since the priority FIFO memory 7211 is first vacant and the contents of the non-priority FIFO memory 7221 indicate the buffer number ①, as shown in FIG. 7, lines G and H, the priority control circuit 741 first couples together the buffer memory 41 and the outgoing line 2① in accordance with the control signal shown in FIG. 7, line I to deliver the output of the buffer memory 41 shown in FIG. 7, line J to the outgoing line 2① as being the packet 1, as shown in FIG. 7, line M. After delivering the packet 1, the priority control circuit 741 reads out the contents of the priority FIFO memory 7211. Since, at this time, the buffer number 1 is read out, as shown in FIG. 7, line H, the priority control circuit 741 couples together the buffer memory 4l and the outgoing line 2① in accordance with the control signal shown in FIG. 7, line I to deliver the output of the buffer memory 4l shown in FIG. 7, line L to the outgoing line 2① as being the packet 3, as shown in FIG. 7, line M.

After delivering the packet 3, the priority control circuit 741 reads out the contents of the priority FIFO memory 7211. Since, at this time, no buffer number is read out, as shown in FIG. 7, line H, the priority control circuit 741 then reads out the contents of the non-priority FIFO memory 7221. Since the buffer number ② is read out at this time, as shown in FIG. 7, line G, the priority control circuit 741 couples together the buffer memory 42 and the outgoing line 2① in accordance with the control signal shown in FIG. 7, line I to deliver the output of the buffer memory 42 shown in FIG. 7, line K to the outgoing line 2① as being the packet 2, as shown in FIG. 7, line M.

By virtue of the above-described control circuit, the packet 3 of priority which arrived after the packet 2 can be delivered before it.

(5) One embodiment of the present invention in which the data exchange apparatus is adapted for broadcasting will next be explained with reference to FIGS. 8 and 9. In FIG. 8, the reference numeral 1 denotes incoming lines, 2 outgoing lines, 3 a vacant buffer selecting switching circuit, 4 a buffer memory, 5 a header memory circuit, 6 an outgoing line selecting circuit, 71 a buffer coupling switching circuit serving as a buffer coupling means which is provided in correspondence to each outgoing line 2, 721 to 72m FIFO memories for storing buffer memory identification information in a predetermined order, and 731 to 73m buffer number encoding circuits. The reference numeral 91 denotes a broadcasting buffer number encoding circuit which serves as a broadcasting buffer number encoding means, 92 a broadcasting FIFO memory, 94 a broadcasting switch control circuit (a broadcasting switch control means), and 951 to 95m broadcasting switches.

The broadcasting buffer member encoding circuit 91 and the broadcasting FIFO memory 92 constitute in combination a broadcasting storage memory. The broadcasting switch control circuit 94 and the broadcasting switches 951 to 95m constitute a switching means.

In the arrangement shown in the figure, the number of incoming lines is n, the number of buffer memories is l, and the number of outgoing lines is m. Accordingly, the reference numerals 41, 42 ... 4*l* denote l buffer memories, 51, 52 ... 5*l* l header memory circuits, and 61, 62 ... 6*l* l outgoing line selecting circuits. In addition, the reference numerals 711, 712 ... 71*m* denote m buffer coupling switching circuits, 721, 722 ... 72*m* m FIFO memories, 731, 732 ... 73*m* m buffer number encoding circuits, and 951, 952 ... 95*m* m broadcasting switches. The m FIFO memories 721 to 72*m* and the m buffer number encoding circuits 731 to 73*m* constitute in combination an individual storage memories. ① to ⓝ which are put at the incoming lines 1 denote the respective numbers of the incoming lines 1, ① to ① at the buffer memory 4 denote the buffer numbers, and ① to Ⓜ at the outgoing lines 2 denote the respective numbers of the outgoing lines 2.

It is assumed that the memory capacity of the FIFO memories 721 to 72*m* is sufficiently large to store the buffer numbers of all (l) the buffer memories. In addition, each FIFO memory and the corresponding buffer number encoding circuit constitute in combination an individual memory means for individual packet.

FIG. 9 is a chart employed to explain the flow of control carried out in the case where two individual packets which are addressed to the outgoing line 2① are received from the incoming lines 1① and 1② and, at the same time, a broadcasting packet which is addressed to the outgoing lines 2① and 2② is received from the incoming line 1ⓝ when the buffer memories 42, 43 and 4*l* are vacant in the arrangement exemplarily shown in FIG. 8.

In FIG. 9, the line A shows the signal format at the incoming line 1① shown in FIG. 8; the line B shows the signal format at the incoming line 1②; the line C shows the signal format at the incoming line 1ⓝ; the line D shows one of the outputs of the outgoing line selecting circuit 62 which is delivered to the outgoing line 2①; the line E shows one of the outputs of the outgoing line selecting circuit 63 which is delivered to the outgoing line 2①; the line F shows one of the outputs of the outgoing line selecting circuit 6*l* which is used for broadcasting; the line G shows the input to a broadcasting switch control circuit 94; the line H shows the state of the broadcasting switch corresponding to the outgoing line 2①; the line I shows the state of the broadcasting switch corresponding to the outgoing line 2②; the line J shows the output of the broadcasting switch corresponding to the outgoing line 2①; the line K shows the output of the broadcasting switch corresponding to the outgoing line 2②; the line L shows the output of the buffer memory ②; the line M shows the output of the buffer memory ③; the line N shows the output of the buffer memory ⓝ; the line O shows the output delivered to the outgoing line 2①; and the line P shows the output delivered to the outgoing line 2②.

In FIGS. 8 and 9, packets are employed as one example of the form of input data, and it is assumed that each packet has a fixed length and the header section thereof represents an outgoing line number in coded form.

When a packet arrives at an incoming line 1, the vacant buffer selecting switching circuit 3 selects one vacant buffer memory 4 and couples the incoming line 1 to the selected buffer memory 4 irrespective of whether the received packet is a broadcasting packet which performs broadcasting or an individual packet which does not perform broadcasting. The packet received from the incoming line 1 is sent to the vacant buffer memory 4 and also supplied to the header memory circuit 5. The header memory circuit 5 extracts only the header section from the packet and stores therein the contents of the header.

The outgoing line selecting circuit 6 refers to the contents of the header memory circuit 5, and if the received packet is an individual packet, the circuit 6 outputs "1" to the output line corresponding to the outgoing line number designated by the contents of the header memory circuit 5 and outputs "0" to the output lines corresponding to the other outgoing line numbers, thereby supplying the signals "1" and "0" to the buffer number encoding circuits 73 provided in correspondence to the outgoing lines 2, respectively. If the received packet is a broadcasting packet, the outgoing line selecting circuit 6 outputs "0" to the output lines provided to correspond to the outgoing lines 2 and outputs "1" to the broadcasting buffer number encoding circuit 91.

When receiving the signal "1" from an outgoing line selecting circuit 6, the broadcasting buffer number encoding circuit 91 encodes the number of the buffer memory 4 concerning this outgoing line selecting circuit 6 and writes it in the broadcasting FIFO memory 92. The signals from all the outgoing line selecting circuits 6 are "0", the broadcasting buffer number encoding circuit 91 outputs no signal. When the broadcasting buffer number encoding circuit 91 simultaneously receives the signals "1" from a plurality of outgoing line selecting circuits 6, for example, in a case where a plurality of broadcasting packets are simultaneously received, the broadcasting buffer number encoding circuit 91 prioritizes these signals "1" during the buffer number encoding processing and successively writes the encoded buffer numbers in the broadcasting FIFO memory 92, for example, in ascending numerical order.

The broadcasting switch control circuit 94 refers to the header memory circuits 5 corresponding to the buffer memories 4 designated by the broadcasting FIFO memory 92 to detect a plurality of outgoing lines 2 to which the received broadcasting packets are addressed. Further, the broadcasting switch control circuit 94 changes the broadcasting switches corresponding to the detected outgoing lines 2 to the broadcasting mode, so that these broadcasting switches output the encoded buffer numbers in the broadcasting FIFO memory 92 to the buffer coupling switching circuit 71. In the meantime, the broadcasting switch control circuit 94 changes to the individual mode the broadcasting switches corresponding to the outgoing lines 2 other than those to which the received broadcasting packets are addressed, so that these broadcasting switches individually output the encoded buffer numbers in the corresponding FIFO memories, which are provided in correspondence to the outgoing lines 2, to the buffer coupling switching circuit 71.

The buffer coupling switching circuit 71 simultaneously changes over the switches in accordance with the buffer numbers detected with reference to the broadcasting switches, thereby synchronously coupling together the buffer memories 4 and the relevant outgoing lines 2. Next, the data stored in the buffer memories 4 are delivered to the outgoing lines 2. At this time, there is no danger that broadcasting data and non-broadcasting data will collide with each other, since the buffer coupling switching circuit 71 is synchronized with all the outgoing lines 2.

By virtue of the above-described control operation, when a broadcasting packet is received, it is preferentially and simultaneously read out from the buffer memory to the outgoing lines concerned. There is therefore no danger of a broadcasting packet failing to reach all the desired outgoing lines as in the prior art system.

Although in the foregoing embodiment, the number of incoming lines is n, the number of buffer memories is l and the number of outgoing lines is m, the number of these elements may be selected as desired.

Although the vacant buffer selecting switching circuit shown in FIG. 8 is arranged to select incoming lines and buffer memories preferentially in ascending numerical order, it is possible to employ any desired order of selection as long as no blocking (collision) occurs when a plurality of incoming signals are simultaneously received and a plurality of buffer memories are simultaneously released. The same advantageous effects as those in the foregoing embodiment are obtained regardless of the type of preferential selection.

Although in the foregoing embodiment the header section of each packet represents the number of an outgoing line in coded form, it is also possible to employ a bit string having length corresponding to the total number of outgoing lines, in which the bits are assigned in one-to-one correspondence to the outgoing lines. The arrangement may also be such that the broadcasting outgoing lines are divided into groups and the packet header section is adapted to designate a desired one of the groups. In short, it is possible to employ any kind of destination information as long as it can specify a particular outgoing line.

Although in the foregoing embodiment the numbers of buffer memories are employed to specify these buffer memories, any kind of identification information which can specify the buffer memories may be employed, for example, the addresses of the buffer memories.

(6) One modification of the embodiment described in the section (5) will next be explained. In the foregoing embodiment, all the buffer coupling switching circuits are synchronized with each other by means, for example, of simultaneous switching to deliver data, thereby avoiding collision between broadcasting data and non-broadcasting data. However, if the arrangement is such that, when broadcasting data enters the broadcasting switch control circuit, the processing which is carried out in the outgoing line selecting circuit and those circuits subsequent thereto is suspended for a predetermined period of time and the broadcasting switch control circuit delays by a predetermined period the time at which it instructs the broadcasting switch of each outgoing line to perform a switching operation, it is possible to avoid collision between broadcasting data and non-broadcasting data and hence realize the broadcasting function. It should be noted that the above-mentioned predetermined period of time is only needed to be not shorter than the time required to deliver one piece of broadcasting data to outgoing lines to which it is addressed because it is only necessary to provide a period of time required to process data which has already been processed by the outgoing line selecting circuit but not yet been outputted to the desired outgoing lines.

Thus, the present invention provides the following advantages:

(1) According to the present invention, a plurality of buffer memories capable of independently reading and writing data in the form of data units are provided to write data from any incoming line in any vacant buffer memory and the identification information of this buffer memory is stored in an FIFO or other similar memory corresponding to the outgoing line designated by the destination information of the data so that the data is read out from the buffer memory designated by the contents of the FIFO or other similar memory and delivered to the desired outgoing line. Accordingly, even if a plurality of data are simultaneously received, they are serially delivered in a given order, and there is therefore no danger of data being lost due to blocking (collision). In addition, the incoming lines can receive data completely independently of each other. Similarly, the outgoing lines can send data completely independently of each other. Since the buffer memories are common to the incoming lines, it is possible to cope with data arriving at random with a smaller number of memories than in the case where a buffer memory is provided for each individual line.

Since the numbers of incoming lines and outgoing lines can be selected as desired, it is possible to effect a concentration of data by the data exchange apparatus of the present invention.

(2) In the data exchange apparatus of the present invention, memories which are capable of simultaneously reading and writing are employed as the above-described buffer memories to send data while receiving it, thereby enabling a reduction in the time during which data remains in the exchange switch, and thus permitting an increase in the switching speed.

(3) In the data exchange apparatus of the present invention, buffer memories are divided into groups, and a vacant buffer selecting means is provided to correspond to each group of buffer memories so as to be common to them.

Accordingly, even if received data concentrate on a certain group of buffer memories and these memories overflow, the other groups of buffer memories can operate independently of the overflowing buffer memories.

(4) In the data exchange apparatus of the present invention, the number of storage memories provided to correspond to the outgoing lines in the arrangement stated in the paragraph (1) is increased by an amount corresponding to the number of priority levels of data and the identification information of the buffer memory concerned is stored in the storage memory corresponding to the outgoing line number designated by the destination information and priority information of the data stored in the buffer memory and the priority level of the data so that the pieces of identification information are read out from the storage memories in the order of descending priority and the data are serially delivered from the buffer memories designated by the contents of the storage memories. Accordingly, when a plurality of data are simultaneously received, a data item of relatively high priority can be delivered before those of relatively low priority.

(5) Further, according to the present invention, a plurality of buffer memories capable of independently reading and writing data in the form of data units are provided in parallel so that broadcasting and individual data are written in any vacant buffer memories and, when the data are read out, the outgoing lines are synchronized with each other, thereby preventing collision between the data. In addition, broadcasting data can be preferentially outputted only to outgoing lines to which it is addressed. The data exchange apparatus of the present invention is therefore capable of broadcasting when receiving broadcasting data. Since buffer memories which are common to the incoming lines are provided so as to enable data to be outputted to the desired outgoing line after being temporarily stored in the buffer, it is possible to effect broadcasting with a smaller number of memories than in the case where a buffer memory is provided for each individual line and a number of copies of broadcasting data which corresponds to the number of destination outgoing lines are made and stored in the respective buffer memories.

(6) In addition, according to the present invention, broadcasting data is delayed by a predetermined time when read out from the buffer memory. It is therefore possible to avoid a collision between broadcasting and non-broadcasting data, and none of the buffer coupling switching circuits need be synchronized with each other.

What is claimed is:

1. A data exchange apparatus having a plurality of incoming lines and a plurality of outgoing lines and designed to receive data, having a header carrying a destination information from an incoming line and to output data to a given outgoing line, comprising:
    (a) a plurality of buffer memories, each of them having an identification information, for temporarily storing data from incoming lines in a form of data units;
    (b) a vacant buffer selecting means for selecting a vacant buffer memory from said buffer memories to input data from an incoming line and coupling together the selected buffer memory and said incoming line;
    (c) storage memories provided to correspond to said outgoing lines to identify data which are to be outputted to the corresponding outgoing lines, said storage memories storing in a predetermined order the identification information of buffer memories having input data stored therein;
    (d) an outgoing line selecting means for detecting an outgoing line from the destination information of the stored data and outputting the identification information of the buffer memory stored with the data to the storage memory corresponding to the detected outgoing line, said outgoing line selecting means being provided in correspondence to each buffer memory to detect the destination of the data stored in the corresponding buffer memory; and
    (e) buffer coupling means for receiving the identification information of buffer memories stored in the storage memories in a predetermined order and coupling together the identified buffer memories and the corresponding outgoing lines, said buffer coupling means being provided in correspondence to said outgoing lines to output data to the corresponding outgoing lines, respectively.

2. A data exchange apparatus according to claim 1, wherein said buffer memories are capable of simultaneously inputting and outputting data based on said vacant buffer selecting means and said buffer coupling means, respectively.

3. A data exchange apparatus according to claim 1, wherein each of said buffer memories is capable of inputting and outputting data independently of the other buffer memories.

4. A data exchange apparatus according to claim 1, wherein
    (a) said buffer memories are divided into buffer memory groups formed by grouping a plurality of buffer memories for temporarily storing data from incoming lines in the form of data units; and
    (b) said vacant buffer selecting means is divided into a plurality of vacant buffer selecting means corresponding to each buffer memory group, each of the divided vacant buffer selecting means selecting a vacant buffer memory from a plurality of buffer memories in the corresponding buffer memory group to input data from an incoming line and coupling together the selected buffer memory and said incoming line.

5. A data exchange apparatus according to claim 1, said apparatus receiving data having different priority levels, wherein
    (a) said storage memories are provided to correspond to said outgoing lines to identify data which are to be outputted to the corresponding outgoing lines and also to correspond to priority levels of data;
    (b) said outgoing line selecting means detects an outgoing line from the destination information of the stored data and further detects the priority level of the stored data and then outputs the identification information of the buffer memory stored with the data to the storage memory corresponding to the detected outgoing line and priority level; and
    (c) said buffer coupling means has a means provided to correspond to said outgoing lines, for receiving the identification information of buffer memories from the storage memories corresponding to higher priority level.

6. A data exchange apparatus according to claim 1, wherein the data input operation to the vacant buffer memory is carried out independently form other data input operations, by said vacant buffer selecting means.

7. A data exchange apparatus according to claim 1, wherein said vacant buffer selecting means includes:
    (a) a switch portion having said incoming lines and input lines to said buffer memories arranged in a matrix, and switching elements respectively provided at the intersections of the incoming lines and input lines to control connection between the corresponding incoming lines and input lines; and
    (b) a selecting means for selecting one vacant buffer memory from the buffer memories and activating the switching element disposed at the intersection of the input line of the selected buffer memory and the incoming line.

8. A data exchange apparatus according to claim 7, wherein said incoming line has an incoming line number, and said selecting means includes:
    (a) an incoming line number memory circuit provided in coresspondence to each buffer memory to store the incoming line number of an incoming line connected to the input line of said buffer memory;
    (b) an incoming indicating means for holding a data incoming request from an incoming line;
    (c) a priority encoder for outputting in a predetermined priority order the incoming line numbers of the incoming lines whose incoming requests are held in said incoming indicating means;
    (d) a buffer selection priority control circuit for storing the incoming line number outputted from said priority encoder into one vacant incoming line number memory circuit with a predetermined priority level; and
    (e) a decoder provided in correspondence to each buffer memory to specify an incoming line from the incoming line number stored in the corresponding incoming line number memory circuit and activate the switching element disposed at the intersection of the input line of the corresponding buffer memory and the specified incoming line.

9. A data exchange apparatus according to claim 8, wherein said buffer memory has a buffer number, and said buffer selection priority control circuit has a means for selecting, when there are a plurality of incoming line number memory circuits having no incoming line numbers stored therein, one of them according to the buffer numbers of the corresponding buffer memories.

10. A data exchange apparatus according to claim 8, wherein said buffer memory generates a buffer release signal, and said incoming line number memory circuit has a means for resetting the incoming line number memory circuit in response to the buffer release signal from the corresponding buffer memory.

11. A data exchange apparatus according to claim 8, wherein said decoder has a means for generating a buffer memory vacancy indicating signal indicating that the corresponding buffer memory is vacant and outputting it to said buffer selection priority control circuit.

12. A data exchange apparatus according to claim 1, wherein said outgoing line selecting means includes:
  (a) a header memory means provided to correspond to each buffer memory, for storing the header of data which carries the destination information of the data; and
  (b) an outgoing line selecting circuit which detects an outgoing line from the destination information stored in said header memory means and outputs the identification information of a buffer memory stored with the data to the storage memory corresponding to the detected outgoing line.

13. A data exchange apparatus according to claim 1, wherein said storage memories include:
  (a) FIFO memories provided to correspond to said outgoing lines to store the identification information of buffer memories having input data stored therein; and
  (b) an encoding means for writing the identification information of said buffer memories into said FIFO memories in a predetermined order.

14. A data exchange apparatus according to claim 13, wherein said buffer memory has a buffer number, and said identification information is the buffer number of the buffer memory having input data stored therein.

15. A data exchange apparatus according to claim 14, wherein said encoding means has a means for prioritizing a plurality of outputs when simultaneously delivered thereto from said outgoing line selecting means according to the buffer numbers of the relevant buffer memories.

16. A data exchange apparatus according to claim 1, further comprising a broadcasting means for outputting data inputted from one incoming line to a plurality of outgoing lines in accordance with the destination information of the input data, wherein the data is characterized as an individual data which is to be outputted to a single outgoing line and as a broadcasting data which is to be outputted to a plurality of outgoing lines.

17. A data exchange apparatus according to claim 16, wherein said broadcasting means includes:
  (a) a broadcasting storage memory for storing in a predetermined order the identification information of buffer memories having broadcasting data stored therein;
  (b) a means for identifying data input from an incoming line as individual data or as broadcasting data from the destination information of the input data and outputting, when the input data is identified as broadcasting data, the identification information of said data to said broadcasting storage memory; and
  (c) a switching means for detecting the identification information outputted to said broadcasting storage memory, specifying a plurality of outgoing lines to which broadcasting data is to be outputted from the destination information of the broadcasting data, and switching the connection to said broadcasting storage memory so that the detected identification information can be outputted to lines respectively corresponding to the specified outgoing lines.

18. A data exchange apparatus having a plurality of incoming lines and a plurality of outgoing lines and designed to receive data, having a destination information, from an incoming line and to output data to a given outgoing line, comprising:
  (a) a plurality of buffer memories for temporarily storing data from incoming lines in the form of data units, each buffer memory being accessible independently of the other buffer memories and identifiable by identification information;
  (b) a vacant buffer selecting means for selecting a vacant buffer memory from said buffer memories to input data from an incoming line and for coupling together the selected buffer memory and said incoming lines; and
  (c) an output means, responsive to the identification information of the selected buffer memory, for detecting an outgoing line from the destination information of data stored in the selected buffer memory and outputting the data to the detected outgoing line.

19. A data exchange apparatus according to claim 18, wherein said buffer memories are capable of simultaneously receiving and outputting data in response to said vacant buffer selecting means and said output means, each of said buffer memories being capable of inputting and outputting data independently of the other buffer memories.

20. A data exchange apparatus having a plurality of incoming lines and a plurality of outgoing lines and designed to receive data, having a destination information, from an incoming line and to output data to a given outgoing line while identifying the input data as individual data which is to be outputted to a single outgoing line or as broadcasting data which is to be outputted to a plurality of outgoing lines from the destination information of the input data, comprising:
  (a) a plurality of buffer memories, each of them having an identification information, for temporarily storing data from incoming lines in the form of data units;
  (b) a vacant buffer selecting means for selecting a vacant buffer memory from said buffer memories to input data from an incoming line and coupling together the selected buffer memory and said incoming line;
  (c) storage memories for storing the identification information of buffer memories in a predetermined order, said storage memories including,
    (c1) individual storage memories provided to correspond to said outgoing lines to identify individual data which is to be outputted to a given outgoing line, said individual storage memories storing in a predetermined order the identification information of buffer memories having input individual data stored therein, and (c2) a broadcasting storage memory for storing in a predetermined order the identification information of buffer memories having input broadcasting data stored therein;

(d) outgoing line selecting means for identifying input data as individual data or broadcasting data from the destination information of the data, and said outgoing line selecting means having, (d1) a means for detecting, when the input data is identified as individual data, an outgoing line to which the data is to be outputted and outputting the identification information of the buffer memory stored with the individual data to the storage memory corresponding to the detected outgoing line, and (d2) a means for outputting, when the input data is identified as broadcasting data, the identification information of the buffer memory stored with the broadcasting data to said broadcasting storage memory;

(e) a switching means for detecting the identification information of a buffer memory outputted to said broadcasting storage memory, specifying a plurality of outgoing lines to which broadcasting data is to be outputted from the destination information of the broadcasting data, and switching the connection between said individual storage memories and said broadcasting storage memory so that the detected identification information can be outputted to lines respectively corresponding to the specified outgoing lines; and (f) a buffer coupling means for receiving the identification information of a buffer memory stored in the storage memory selected by said switching means to couple together the identified buffer memory and the corresponding outgoing line, said buffer coupling means provided to correspond to each outgoing line to output data to the corresponding outgoing line.

21. A data exchange apparatus according to claim 20, wherein said buffer coupling means has a means for synchronously outputting the broadcasting data stored in the buffer memory to all the outgoing lines when the storage memory stored with the identification information of the buffer memory is said broadcasting storage memory.

22. A data exchange apparatus according to claim 20, wherein said switching means detects the identification information of a buffer memory outputted to said broadcasting storage memory, specifies a plurality of outgoing lines to which broadcasting data is to be outputted from the destination information of the broadcasting data, and switches the connection between said individual storage memories and said broadcasting storage memory so that the detected identification information can be outputted to lines respectively corresponding to the specified outgoing lines, after suspending the execution of the outgoing line selecting means for a predetermined period of time.

23. A data exchange apparatus according to claim 20, wherein said switching means includes:

(a) a broadcasting switch provided to correspond to each outgoing line to switch the connection between the corresponding individual storage memory and said broadcasting storage memory; and (b) a broadcasting switch control means for detecting the identification information of a buffer memory outputted to said broadcasting storage memory, specifying a plurality of outgoing lines to which broadcasting data is to be outputted from the destination information of the broadcasting data, and controlling switching of the broadcasting switches so that the identification information can be outputted to lines corresponding to the specified outgoing lines.

24. A data exchange apparatus according to claim 20, wherein said buffer memories are capable of simultaneously receiving data from said vacant buffer selecting means and outputting data to said buffer coupling means.

25. A data exchange apparatus according to claim 20, wherein (a) said buffer memories are divided into buffer memory groups formed by grouping a plurality of buffer memories for temporarily storing data from incoming lines in the form of data units; and (b) said vacant buffer selecting means is divided into a plurality of vacant buffer selecting means corresponding to each buffer memory group for selecting a vacant buffer memory from a plurality of buffer memories in the corresponding buffer memory group to input data from an incoming line and coupling together the selected buffer memory and said incoming line.

26. A data exchange apparatus according to claim 20 which comprises, in order to process data having priority levels:

(a) said storage memories provided to correspond to said outgoing lines to identify data which are to be outputted to the corresponding outgoing lines and also in correspondence to priority levels of data;

(b) said outgoing line selecting means identifies the data as individual data or broadcasting data from the destination information thereof and detects an outgoing line for the identified data, said outgoing line selecting means further detecting a priority level from the priority information of the data and then outputting the identification information of the buffer memory stored with the data to the storage memory corresponding to the detected outgoing line and priority level; and (c) said buffer coupling means has a means provided to correspond to said outgoing lines, for receiving the identification information of buffer memories from the storage memories corresponding to higher priority level.

27. A data exchange method comprising the steps of:

(a) storing data from an incoming line to a vacant buffer memory having an identification information;

(b) selecting an outgoing line from a destination information of the stored data;

(c) outputting the identification information of the buffer memory stored with the data; and (d) coupling the buffer memory and the outgoing line to output the data to the outgoing line after receiving the identification information of the buffer memory.

28. A data exchange method according to claim 27, wherein the storing step comprises the steps of:

(a) selecting the vacant buffer memory from a plurality of buffer memories; and
(b) connecting a switch to connect the incoming line and input line complect to the selected buffer memory.

29. A data exchange method according to claim 28, wherein the storing steps and the coupling step are executed simultaneously with regard to the selected buffer memory.

30. A data exchange method according to claim 27, wherein the storing step has the step of simultaneously executing the storing step when a plurality of data are inputted from the incoming lines.

31. A data exchange method according to claim 27, wherein the coupling step has the step of simultaneously executing the coupling step when a plurality of identification information are received from the outputting step.

* * * * *